United States Patent
Shimizu

(10) Patent No.: US 11,097,740 B2
(45) Date of Patent: Aug. 24, 2021

(54) FOUR-WHEEL DRIVE VEHICLE

(71) Applicant: TOYOTA JIDOSHA KABUSHIKI KAISHA, Toyota (JP)

(72) Inventor: Daichi Shimizu, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 147 days.

(21) Appl. No.: 16/582,148

(22) Filed: Sep. 25, 2019

(65) Prior Publication Data
US 2020/0122730 A1     Apr. 23, 2020

(30) Foreign Application Priority Data
Sep. 25, 2018 (JP) ............... JP2018-179487

(51) Int. Cl.
| | |
|---|---|
| B62D 1/12 | (2006.01) |
| B60W 40/068 | (2012.01) |
| B60W 10/119 | (2012.01) |
| F16H 59/66 | (2006.01) |
| F16H 63/30 | (2006.01) |

(52) U.S. Cl.
CPC ........ *B60W 40/068* (2013.01); *B60W 10/119* (2013.01); *F16H 59/66* (2013.01); *B60W 2300/18* (2013.01); *F16H 2063/3093* (2013.01)

(58) Field of Classification Search
CPC ............. B60W 40/068; B60W 10/119; B60W 2300/18; B60W 2552/40; F16H 59/66; F16H 2063/3093; B60Y 2400/4244; B60Y 2400/421; B60K 17/3515; B60K 2023/0833; B60K 23/0808; B60K 23/08; B60K 17/35; B60K 17/348; B60K 17/344; B60K 17/354; B60K 2023/085
USPC ......................................................... 701/71
See application file for complete search history.

(56) References Cited

U.S. PATENT DOCUMENTS

| | | | |
|---|---|---|---|
| 10,759,277 B2* | 9/2020 | Tanaka ............ | B60W 30/18063 |
| 2011/0257858 A1* | 10/2011 | Kobayashi ......... | B60K 17/3462 701/69 |
| 2016/0193917 A1* | 7/2016 | Horiike .................. | B60K 17/35 701/54 |

(Continued)

FOREIGN PATENT DOCUMENTS

| | | | |
|---|---|---|---|
| JP | 63011441 A | * | 1/1988 |
| JP | 2015-224005 A | | 12/2015 |

*Primary Examiner* — Jonathan M Dager
*Assistant Examiner* — Jean W Charleston
(74) *Attorney, Agent, or Firm* — Oliff PLC

(57) ABSTRACT

A four-wheel drive vehicle comprises: a dog clutch; an electronically controlled coupling; and a control device switching a drive state to the four-wheel drive state when the control device determines that a running road surface is a low friction road and switching the drive state to the two-wheel drive state when the control device determines that the running road surface is a high friction road. In the case of switching the drive state from the four-wheel drive state to the two-wheel drive state, the control device temporarily releases the electronically controlled coupling to redetermine whether the running road surface is the low friction road or the high friction road before releasing the dog clutch and prohibits switching from the four-wheel drive state to the two-wheel drive state when it is redetermined that the running road surface is the low friction road.

7 Claims, 12 Drawing Sheets

(56) References Cited

U.S. PATENT DOCUMENTS

2017/0057515 A1\* 3/2017 Kelly ................... B60W 10/22
2017/0113546 A1\* 4/2017 Maeda ............... B60K 17/3515

\* cited by examiner

FOUR-WHEEL DRIVE VEHICLE

This application claims priority from Japanese Patent Application No. 2018-179487 filed on Sep. 25, 2018, the disclosure of which is incorporated herein by reference in its entirety.

FIELD OF THE INVENTION

The present invention relates to a technique for appropriately controlling the dog clutch in a case where a running road surface is a low friction load, in a four-wheel drive vehicle switching to a four-wheel drive state in which a dog clutch and an electronically controlled coupling are each brought into an engaged state when it is determined that the running road surface is the low friction road and switching to a two-wheel drive state in which the dog clutch is brought into a released state when it is determined that the running road surface is a high friction road.

DESCRIPTION OF THE RELATED ART

There is known a four-wheel drive vehicle comprising: (a) a dog clutch selectively disconnecting or connecting a power transmission path between an input rotating member to which a portion of a drive power from a drive power source toward main drive wheels is input and an output rotating member coupled to sub-drive wheels in a power transmittable manner; (b) an electronically controlled coupling disposed on a power transmission path between the drive power source and the sub-drive wheels and adjusting the drive power transmitted from the drive power source to the sub-drive wheels; and (c) a control device providing a switching control between a four-wheel drive state in which the dog clutch is brought into an engaged state while the electronically controlled coupling is brought into an engaged state and a two-wheel drive state in which the dog clutch is brought into a released state. For example, this corresponds to a four-wheel drive vehicle described in Patent Document 1. It is conceivable that the four-wheel drive vehicle as described in Patent Document 1 determines whether a running road surface is a low friction road or a high friction road so as to switch a drive state between the two-wheel drive state and the four-wheel drive state depending on the determination of the running road surface. Specifically, it is conceivable that the four-wheel drive vehicle switches the drive state to the four-wheel drive state when the control device determines that the running road surface is the low friction road and switches the drive state to the two-wheel drive state when the control device determines that the running road surface is the high friction road.

PRIOR ART DOCUMENT

Patent Document
Patent Document 1: Japanese Laid-Open Patent Publication No. 2015-224005

SUMMARY OF THE INVENTION

Technical Problem

It is conceivable that the four-wheel drive vehicle as described above determines whether the running road surface is the low friction road or the high friction road, for example, based on a slip of a wheel during vehicle running. In such a four-wheel drive vehicle, it is determined whether the running road surface is the low friction road or the high friction road when a drive power is transmitted from the wheels to the running road surface.

In this regard, the four-wheel drive vehicle as described above may not accurately determine whether the running road surface is the low friction road or the high friction road, for example, when the drive power is not transmitted from the wheels to the running road surface, and may determine that the running road surface is the high friction road even though the running road surface is actually the low friction road. If it is determined that the running road surface is the high friction road even though the running road surface is actually the low friction road in this way, the dog clutch and the electronically controlled coupling are each released for switching to the two-wheel drive state, and the dog clutch and the electronically controlled coupling are then each engaged for switching the drive state to the four-wheel drive state. Therefore, a relatively long time is required for bringing the dog clutch, which is switched at a slower switching speed between the engaged state and the released state as compared to the electronically controlled coupling, into the engaged state again, and thus, the vehicle has a problem that the drive power cannot properly be distributed to the main drive wheels and the sub-drive wheels on the low friction road during the relatively long time until the dog clutch is brought into the engaged state again.

The present invention was conceived in view of the situations and it is therefore an object of the present invention to provide a four-wheel drive vehicle suitably suppressing inappropriate release of a dog clutch when a running road surface is a low friction road.

Solution to Problem

To achieve the above object, a first aspect of the present invention provides a four-wheel drive vehicle comprising: (a) a dog clutch selectively disconnecting or connecting a power transmission path between an input rotating member to which a portion of a drive power from a drive power source toward main drive wheels is input and an output rotating member coupled to sub-drive wheels in a power transmittable manner; an electronically controlled coupling disposed on a power transmission path between the drive power source and the sub-drive wheels and adjusting the drive power transmitted from the drive power source to the sub-drive wheels; and a control device providing a switching control between a four-wheel drive state in which the dog clutch is brought into an engaged state while the electronically controlled coupling is brought into an engaged state and a two-wheel drive state in which the dog clutch is brought into a released state, the control device switching a drive state to the four-wheel drive state when the control device determines that a running road surface is a low friction road and switching the drive state to the two-wheel drive state when the control device determines that the running road surface is a high friction road, wherein (b) in the case of switching the drive state from the four-wheel drive state to the two-wheel drive state, the control device temporarily releases the electronically controlled coupling to redetermine whether the running road surface is the low friction road or the high friction road before releasing the dog clutch and prohibits switching from the four-wheel drive state to the two-wheel drive state when it is redetermined that the running road surface is the low friction road.

Advantageous Effects of Invention

According to the four-wheel drive vehicle recited in the first aspect of the invention, in the case of switching the drive state from the four-wheel drive state to the two-wheel drive state, the electrically controlled coupling is temporarily released to redetermine whether the running road surface is the low friction road or the high friction road before releasing the dog clutch, and when it is redetermined that the running road surface is the low friction road, switching from the four-wheel drive state to the two-wheel drive state is prohibited. Therefore, the electrically controlled coupling switched between the engaged state and the released state faster than the dog clutch is temporarily released to redetermine whether the running road surface is the low friction road or the high friction road in the two-wheel drive state in which the drive power from the drive power source is distributed only to the main drive wheels, and when it is redetermined that the running road surface is the low friction road, switching from the four-wheel drive state to the two-wheel drive state is prohibited, so that inappropriate release of the dog clutch is suitably prevented when the running road surface is the low friction road.

DESCRIPTION OF EMBODIMENTS

Figure 1:
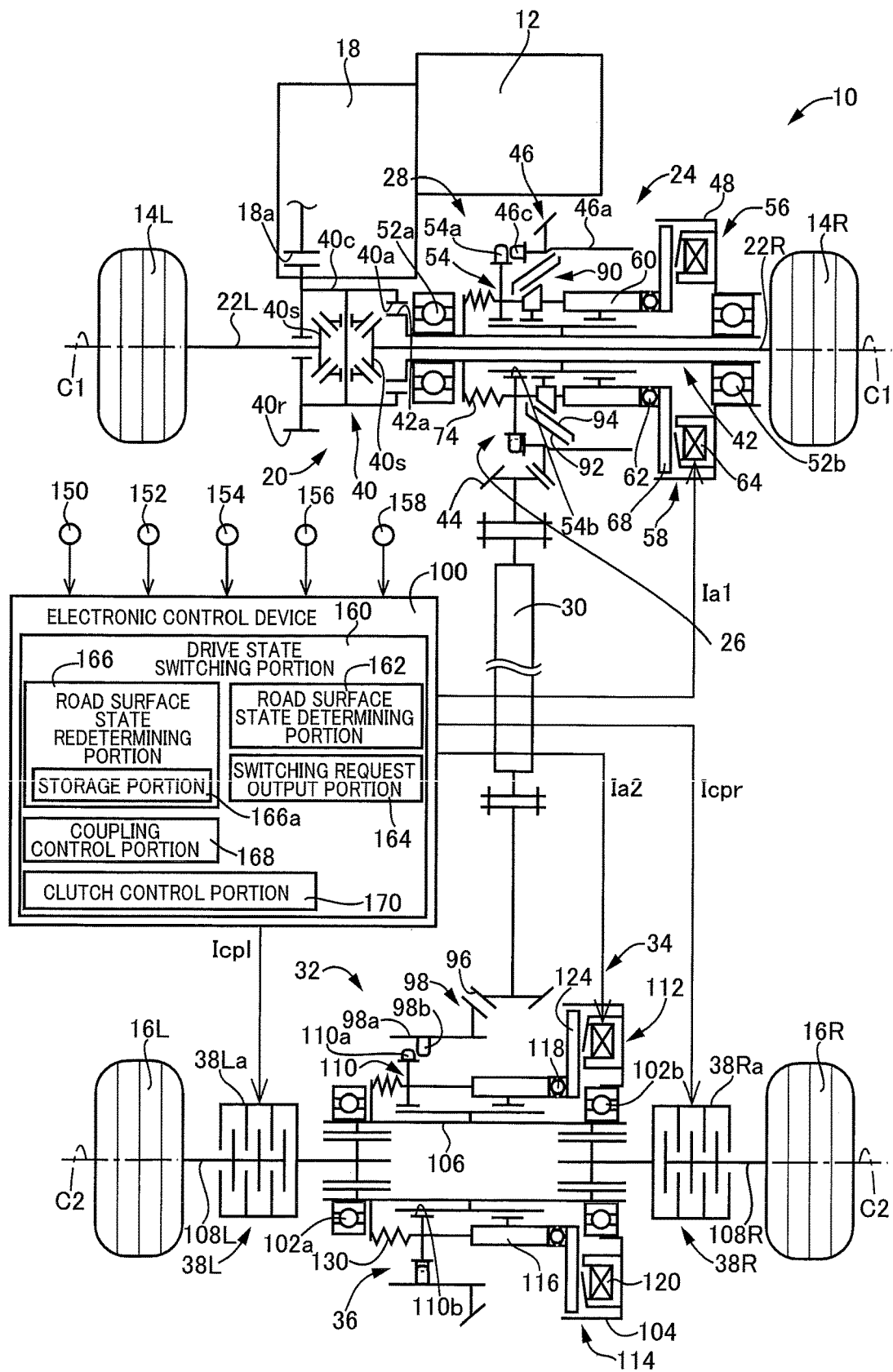
FIG. 1 is a schematic for schematically explaining a configuration of a four-wheel drive vehicle to which the present invention is preferably applied.

A second aspect of the present invention provides the four-wheel drive vehicle recited in the first aspect of the invention, wherein the dog clutch includes (a) a first dog clutch selectively disconnecting or connecting a power transmission path between a first input rotating member to which a portion of the drive power from the drive power source toward the main drive wheels is input and a first output rotating member coupled via a power transmitting member to the sub-drive wheels and (b) a second dog clutch selectively disconnecting or connecting a power transmission path between a second input rotating member coupled to the power transmitting member and a second output rotating member coupled to the sub-drive wheels, wherein (c) the electronically controlled coupling is disposed on a power transmission path between the first output rotating member and the sub-drive wheels, and wherein (d) the control device provides the switching control between a four-wheel drive state in which the first dog clutch and the second dog clutch are each brought into the engaged state while the electronically controlled coupling is brought into the engaged state and a two-wheel drive state in which the first dog clutch and the second dog clutch are each brought into the released state. Therefore, during the two-wheel drive state, the first dog clutch and the second dog clutch are each released, and the power transmitting member interrupts the power transmission from the drive power source and the power transmission from the sub-drive wheels.

A third aspect of the present invention provides the four-wheel drive vehicle recited in the first aspect of the invention, wherein the control device redetermines that the running road surface is the low friction road when a slip ratio of at least one of the main drive wheels and the sub-drive wheels exceeds a first threshold value set in advance or when the slip ratio exceeds a second threshold value set smaller than the first threshold value and the slip ratio exceeds the second threshold value for a time longer than a predetermined time set in advance. Therefore, for example, even if a spike-shaped slip occurs and causes the slip ratio temporarily exceeding the second threshold value when the running road surface is the high friction road and the vehicle passes through unevenness, an errorneous redetermination can be avoided that the running road surface is the low friction road. If the slip ratio exceeds the first threshold value and it can be determined that the running road surface is the low friction road, the running road surface is redetermined as the low friction road even though the predetermined time has not elapsed, so that the time required for redetermining the running road surface as the low friction road can suitably be shortened.

A fourth aspect of the present invention provides the four-wheel drive vehicle recited in the third aspect of the invention, wherein the first threshold value is determined based on the slip ratio before the electronically controlled coupling is temporarily released. Therefore, whether the running road surface is the low friction road can accurately be redetermined in a short time.

A fifth aspect of the present invention provides the four-wheel drive vehicle recited in any one of the first to fourth aspects of the invention, wherein the control device redetermines that the running road surface is the low friction road when a change amount exceeds a predetermined determination value set in advance between a yaw rate deviation before temporarily releasing the electronically controlled coupling and a yaw rate deviation when the electronically controlled coupling is temporarily released. Therefore, it can suitably be redetermined whether the running road surface is the low friction road or the high friction road.

A sixth aspect of the present invention provides the four-wheel drive vehicle recited in any one of the first to fifth aspects of the invention, wherein the electronically controlled coupling is a pair of control couplings respectively coupled to the left and right sub-drive wheels. Therefore, the present invention can suitably be applied to the four-wheel drive vehicle including the left-and-right pair of couplings for the sub-drive wheels.

A seventh aspect of the present invention provides the four-wheel drive vehicle recited in any one of the first to sixth aspects of the invention, wherein the main drive wheels are front wheels, and wherein the sub-drive wheels are rear wheels. Therefore, the present invention can suitably be applied to an FF (front-engine front-wheel drive) type four-wheel drive vehicle.

An example of the present invention will now be described in detail with reference to the drawings. In the following example, the figures are simplified or deformed as needed and portions are not necessarily precisely drawn in terms of dimension ratio, shape, etc.

First Example

FIG. 1 is a schematic for schematically explaining a configuration of a four-wheel drive vehicle 10 to which the present invention is preferably applied. In FIG. 1, the four-wheel drive vehicle 10 has an FF-based four-wheel drive device. The four-wheel drive device includes a first power transmission path transmitting a drive power from an engine (drive power source) 12 to a left-and-right pair of front wheels (main drive wheels) 14L, 14R, and a second power transmission path transmitting a portion of the drive power of the engine 12 to a left-and-right pair of rear wheels (sub-drive wheels) 16L, 16R in a four-wheel drive state.

When the four-wheel drive vehicle 10 is in a two-wheel drive state, the drive power transmitted from the engine 12 through an automatic transmission 18 is transmitted through a front-wheel drive power distributing device 20 and a left-and-right pair of front wheel axles 22L, 22R to the front wheels 14L, 14R. In the two-wheel drive state, at least a first dog clutch (dog clutch) 26 of a first connecting/disconnecting device 24 is released, and the drive power is not transmitted from the engine 12 to a transfer 28, a propeller shaft (power transmitting member) 30, a rear-wheel drive power distributing device 32, and the rear wheels 16L, 16R. However, when the four-wheel drive vehicle 10 is in the four-wheel drive state, the first dog clutch 26 and a second dog clutch 36 of a second connecting/disconnecting device 34 are both engaged and a left control coupling (electronically controlled coupling) 38L and a right control coupling (electronically controlled coupling) 38R are both engaged, so that the drive power is transmitted from the engine 12 to the transfer 28, the propeller shaft 30, the rear-wheel drive power distributing device 32, and the rear wheels 16L, 16R.

As shown in FIG. 1, the front-wheel drive power distributing device 20 includes a first differential device 40 disposed rotatably around a first rotation axis C1. For example, the first differential device 40 includes a ring gear 40r meshed with an output gear 18a of the automatic transmission 18, a differential casing 40c integrally fixed to the ring gear 40r and having a pair of side gears 40s assembled therein, etc. When the drive power is transmitted from the engine 12 to the ring gear 40r, the first differential device 40 configured as described above transmits the drive power to the front wheels 14L, 14R while allowing a differential rotation of the left and right front wheel axles 22L, 22R. The differential casing 40c is provided with inner circumferential meshing teeth 40a fitted to first outer circumferential spline teeth 42a formed on an axial end portion on the front wheel 14L side of an input shaft 42 (first input rotating member) disposed in the transfer 28. As a result, a portion of the drive power transmitted from the engine 12 to the differential casing 40c is input to the transfer 28 via the input shaft 42. Therefore, a portion of the drive power transmitted from the engine 12 to the differential casing 40c, i.e., a portion of the drive power from the engine 12 toward the front wheels 14L, 14R, is input to the input shaft 42.

Figure 2:
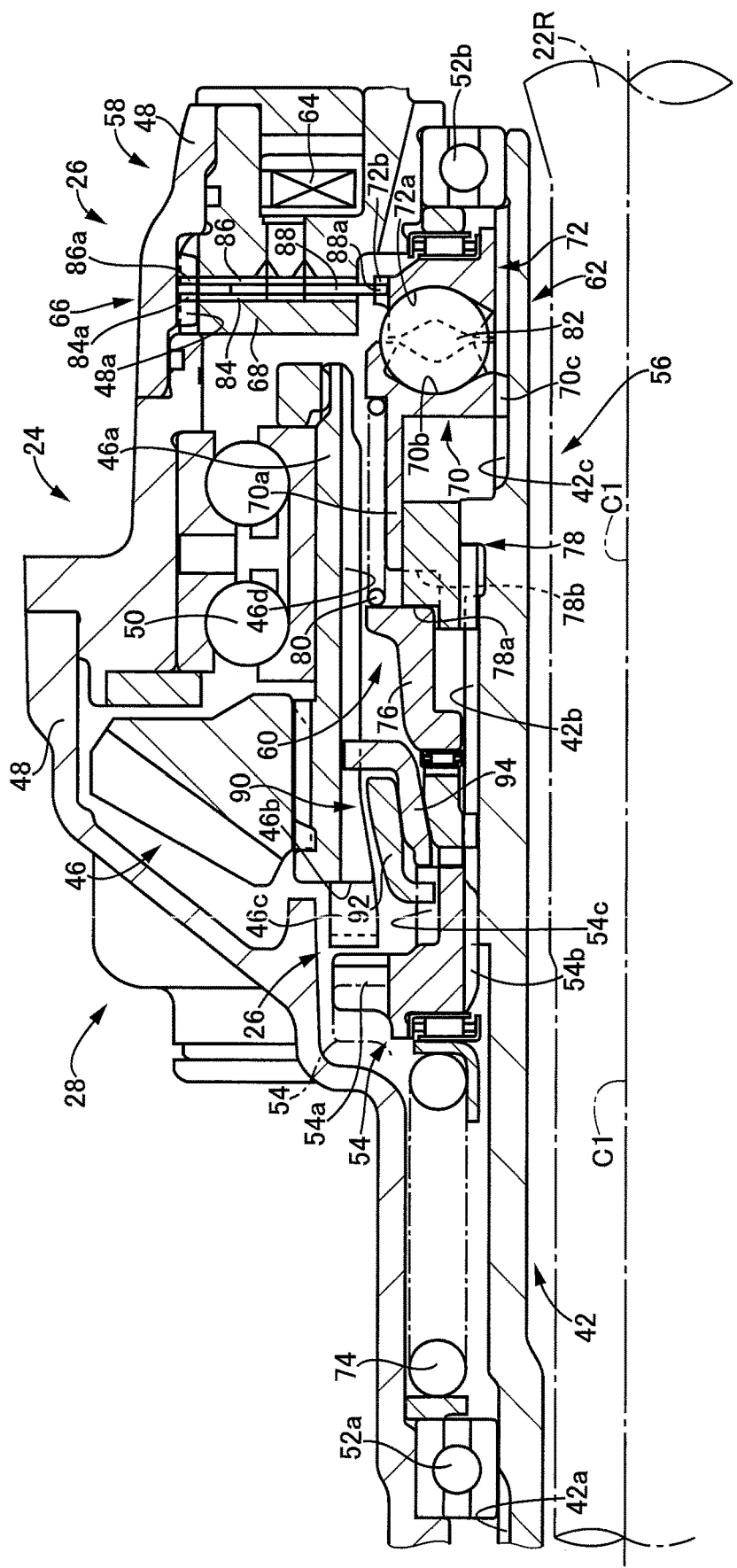
FIG. 2 is a cross-sectional view for explaining a configuration of a first connecting/disconnecting device disposed on the four-wheel drive vehicle of FIG. 1.

As shown in FIGS. 1 and 2, the transfer 28 includes the cylindrical input shaft 42, a cylindrical first ring gear 46 (first output rotating member), and the first connecting/disconnecting device 24. The first ring gear 46 is meshed with a driven pinion 44 (see FIG. 1) coupled to an end portion of the propeller shaft 30 on the side of the front wheels 14L, 14R. The first connecting/disconnecting device 24 selectively disconnects or connects a power transmission path between the input shaft 42 and the first ring gear 46, i.e., a power transmission path between the engine 12 and the propeller shaft 30. When the first connecting/disconnecting device 24 connects the power transmission path between the input shaft 42 and the first ring gear 46, the transfer 28 outputs to the propeller shaft 30 a portion of the drive power transmitted from the engine 12 to the differential casing 40c.

As shown in FIG. 2, the cylindrical first ring gear 46 is a bevel gear having helical teeth or a hypoid gear formed thereon, for example. The first ring gear 46 is provided with a shaft portion 46a projected in a substantially cylindrical shape from an inner circumferential portion of the first ring gear 46 toward the front wheel 14R. For example, the cylindrical first ring gear 46 has the shaft portion 46a supported by a first casing 48 via a bearing 50 disposed in the first casing 48 housing the first connecting/disconnecting device 24 etc. and is thereby supported rotatably around the first rotation axis C1 in a cantilevered manner. While the second dog clutch 36, the left control coupling 38L, and the right control coupling 38R are each engaged, the first ring gear 46 is coupled to the rear wheels 16L, 16R in a power transmittable manner via the propeller shaft 30 etc.

As shown in FIG. 2, the cylindrical input shaft 42 penetrates through the cylindrical first ring gear 46, and a portion of the input shaft 42 is disposed inside the first ring gear 46. The cylindrical input shaft 42 has both end portions supported by the first casing 48 via a pair of bearings 52a, 52b disposed in the first casing 48, so that the input shaft 42 is supported pivotally around the first rotation axis C1. In other words, the input shaft 42 is rotatably supported concentrically with the first ring gear 46. The cylindrical input shaft 42 is provided with the first outer circumferential spline teeth 42a formed on an outer circumferential surface of the axial end portion of the input shaft 42 on the front wheel 14L side, second outer circumferential spline teeth 42b formed on an outer circumferential surface of a central portion of the input shaft 42, and third outer circumferential spline teeth 42c formed on an outer circumferential surface of the end portion of the input shaft 42 on the front wheel 14R side.

As shown in FIG. 2, the first dog clutch 26 includes a plurality of first meshing teeth 46c and a cylindrical first movable sleeve 54. The first meshing teeth 46c are formed on a side surface 46b of the shaft portion 46a of the first ring gear 46 on the front wheel 14L side. The first movable sleeve 54 is provided with a plurality of first meshing teeth 54a that can mesh with the first meshing teeth 46c. The first movable sleeve 54 is provided with inner circumferential meshing teeth 54b meshed with the second outer circumferential spline teeth 42b formed on the input shaft 42 relatively non-rotatably around the first rotation axis C1 with respect to the input shaft 42 and relatively movably in a first rotation axis C1 direction with respect to the input shaft 42. The first movable sleeve 54 is configured such that when the first movable sleeve 54 is moved in the first rotation axis C1 direction by a first moving device 56 disposed in the first connecting/disconnecting device 24, the first meshing teeth 54a of the first movable sleeve 54 selectively mesh with the first meshing teeth 46c of the first ring gear 46.

As shown in FIG. 2, the first moving device 56 selectively moves the first movable sleeve 54 in the first rotation axis C1 direction to a first meshing position and a first non-meshing position to selectively engage the first dog clutch 26. The first meshing position is a position at which the first meshing teeth 54a of the first movable sleeve 54 are meshed with the first meshing teeth 46c of the first ring gear 46. At the first meshing position, the first ring gear 46 and the first movable sleeve 54 cannot relatively rotate, and the first dog clutch 26 is engaged. The first non-meshing position is a position at which the first meshing teeth 54a of the first movable sleeve 54 are not meshed with the first meshing teeth 46c of the first ring gear 46. At the first non-meshing position, the first ring gear 46 and the first movable sleeve 54 can relatively rotate, and the first dog clutch 26 is released. Therefore, the first dog clutch 26 connects the power transmission path between the first ring gear 46 and the input shaft 42 when the first movable sleeve 54 is moved to the first meshing position by the first moving device 56, and disconnects the power transmission path between the first ring gear 46 and the input shaft 42 when the first movable sleeve 54 is moved to the first non-meshing position by the first moving device 56. While the second dog clutch 36, the left control coupling 38L, and the right control coupling 38R are each engaged, the input shaft 42 is an input rotating member to which a portion of the drive power from the engine 12 toward the front wheels 14L, 14R is input, and the first ring gear 46 is an output rotating member coupled to the rear wheels 16L, 16R in a power transmittable manner.

As shown in FIG. 2, the first moving device 56 includes a first electromagnetic actuator 58 and a first ratchet mechanism 60. The first electromagnetic actuator 58 includes, for example, a first ball cam 62, a first electromagnetic coil 64, a first auxiliary clutch 66, etc. In the first electromagnetic actuator 58, when a first movable piece 68 is attracted by the first electromagnetic coil 64 and a rotation braking torque is generated in an annular second cam member 72 via a first auxiliary clutch 66 while the input shaft 42 is rotating, i.e., during vehicle running, the annular second cam member 72 and an annular first cam member 70 are relatively rotated to move the first cam member 70 in the first rotation axis C1 direction. The first ball cam 62 includes the first and second cam members 70 and 72, as described below. When the first cam member 70 is moved in the first rotation axis C1 direction by the first electromagnetic actuator 58, the first ratchet mechanism 60 retains a movement position of the first movable sleeve 54 moved in the first rotation axis C1 direction due to the movement of the first cam member 70. The first moving device 56 includes a first spring 74 constantly urging the first movable sleeve 54 from the first non-meshing position toward the first meshing position, i.e., constantly urging the first movable sleeve 54 toward the front wheel 14R in the first rotation axis C1 direction.

As shown in FIG. 2, the first ratchet mechanism 60 includes an annular first piston 70a, an annular second piston 76, and an annular holder 78 having a plurality of latching teeth, i.e., first latching teeth 78a and second latching teeth 78b, in a circumferential direction. The first ratchet mechanism 60 includes a coil spring 80 disposed in a compressed state between the second piston 76 and the first cam member 70 so as to constantly urge the first cam member 70 toward the second cam member 72. The first piston 70a is reciprocated in the first rotation axis C1 direction with a predetermined stroke by the first ball cam 62 due to the first electromagnetic coil 64 attracting the first movable piece 68 and not attracting the first movable piece 68. Therefore, the first piston 70a is reciprocated in the first rotation axis C1 direction with the predetermined stroke by the operation of the first electromagnetic actuator 58. The second piston 76 moves the first movable sleeve 54 to the first non-meshing position against urging force of the first spring 74 due to the reciprocation of the first piston 70a in the first rotation axis C1 direction. The holder 78 latches the second piston 76 moved by the first piston 70a with one of the first latching teeth 78a and the second latching teeth 78b. The first piston 70a is disposed on the input shaft 42 relatively non-rotatably with respect to the input shaft 42 and movably in the first rotation axis C1 direction with respect to the input shaft 42. The second piston 76 is disposed on the input shaft 42 relatively rotatably with respect to the input shaft 42 and movably in the first rotation axis C1 direction with respect to the input shaft 42. The holder 78 is disposed on the input shaft 42 relatively non-rotatably with respect to the input shaft 42 and immovably in the first rotation axis C1 direction with respect to the input shaft 42.

As shown in FIG. 2, the first ball cam 62 includes an annular pair of the first cam member 70 and the second cam member 72, and a plurality of spherical rolling elements 82. The first cam member 70 and the second cam member 72 are inserted in an overlapping manner in the first rotation axis C1 direction between the second piston 76 of the first ratchet mechanism 60 and the bearing 52b. The spherical rolling elements 82 are sandwiched between a cam surface 70b formed on the first cam member 70 and a cam surface 72a formed on the second cam member 72. When the first cam member 70 and the second cam member 72 are relatively rotated in the first ball cam 62 configured as described above, the first cam member 70 is separated from the second cam member 72 in the first rotation axis C1 direction. The first cam member 70 is provided with inner circumferential teeth 70c meshed with the third outer circumferential spline teeth 42c. The inner circumferential teeth 70c make the first cam member 70 relatively non-rotatable around the first rotation axis C1 with respect to the input shaft 42 and relatively movable in the first rotation axis C1 direction with respect to the input shaft 42.

As shown in FIG. 2, the first auxiliary clutch 66 includes the first movable piece 68 described above, a pair of disk-shaped first friction plates 84, 86 disposed between the first movable piece 68 and the first electromagnetic coil 64, and a disk-shaped second friction plate 88 disposed between the pair of first friction plates 84, 86. Outer circumferential portions of the pair of first friction plates 84, 86 are provided with outer circumferential teeth 84a, 86a respectively, meshed with inner circumferential spline teeth 48a formed on the first casing 48. The outer circumferential teeth 84a, 86a make the first friction plates 84, 86 relatively non-rotatable around the first rotation axis C1 with respect to the first casing 48 and relatively movable in the first rotation axis C1 direction with respect to the first casing 48. An inner circumferential portion of the second friction plate 88 is provided with inner circumferential teeth 88a meshed with outer circumferential spline teeth 72b formed on an outer circumferential portion of the second cam member 72. The inner circumferential teeth 88a make the second friction plate 88 relatively non-rotatable around the first rotation axis C1 with respect to the second cam member 72 and relatively movable in the first rotation axis C1 direction with respect to the second cam member 72.

In the first electromagnetic actuator 58 configured as described above, for example, when a first clutch drive current Ia1 (A) (see FIG. 1) is supplied to the first electromagnetic coil 64 from an electronic control device (control device) 100 described later and the first movable piece 68 is attracted by the first electromagnetic coil 64 while the input shaft 42 is rotating i.e. during vehicle running, the first friction plates 84, 86 and the second friction plate 88 of the first auxiliary clutch 66 are clamped due to the first movable piece 68 between the first movable piece 68 and the first electromagnetic coil 64, so that a rotation braking torque is transmitted to the second friction plate 88, i.e., to the second cam member 72. Therefore, the first cam member 70 and the second cam member 72 are relatively rotated by the rotation braking torque, and the first piston 70a formed integrally with the first cam member 70 moves toward the front wheel 14L against the urging forces of the first spring 74 and the coil spring 80 in the first rotation axis C1 direction with respect to the second cam member 72 via the spherical rolling elements 82. When the first clutch drive current Ia1 (A) is reduced and the first movable piece 68 is no longer attracted by the first electromagnetic coil 64, the rotation braking torque is not transmitted to the second cam member 72, and therefore, the second cam member 72 is rotated together with the first cam member 70 via the spherical rolling elements 82 so that the first piston 70a is moved toward the front wheel 14R by the urging forces of the first spring 74 and the coil spring 80.

For example, when the first piston 70a is reciprocated once in the first rotation axis C1 direction toward the front wheel 14L and the front wheel 14R by the first electromagnetic actuator 58 in the first connecting/disconnecting device 24, as shown in FIG. 2, the first movable sleeve 54 is moved via the first ratchet mechanism 60 to the first non-meshing position against the urging force of the first spring 74, and the second piston 76 is latched on the first latching teeth 78a of the holder 78. For example, when the first piston 70a is reciprocated twice by the first electromagnetic actuator 58, i.e., when the first piston 70a is further reciprocated once while the first movable sleeve 54 is disposed at the first non-meshing position in the first connecting/disconnecting device 24, the second piston 76 is unlatched from the first latching teeth 78a of the holder 78, and when the second piston 76 is latched on the second latching teeth 78b of the holder 78, the first movable sleeve 54 is moved to the first meshing position by the urging force of the first spring 74.

The first connecting/disconnecting device 24 includes a synchronizing device 90. As shown in FIG. 2, the synchronizing device 90 includes, for example, a first friction engagement member 92 meshed with outer circumferential spline teeth 54c formed on the first movable sleeve 54 such that the first friction engagement member 92 is relatively non-rotatable with respect to the first movable sleeve 54 and is movable in the first rotation axis C1 direction with respect to the first movable sleeve 54, a second friction engagement member 94 meshed with inner circumferential spline teeth 46d formed on the first ring gear 46 such that the second friction engagement member 94 is relatively non-rotatable with respect to the first ring gear 46 and is movable in the first rotation axis C1 direction with respect to the first ring gear 46, etc. In the synchronizing device 90 configured as described above, in a case where the first movable sleeve 54 is at the first non-meshing position while the input shaft 42 is rotating, when the first clutch drive current Ia1 (A) is supplied to the first electromagnetic coil 64 from the electronic control device 100 and the first movable sleeve 54 is moved against the urging force of the first spring 74 beyond the first non-meshing position toward the front wheel 14L, the first friction engagement member 92 coupled to the first movable sleeve 54 in a power transmittable manner is frictionally engaged with the second friction engagement member 94 coupled to the first ring gear 46 in a power transmittable manner, and rotation speed of the first movable sleeve 54 is synchronized with rotation speed of the first ring gear 46. The first movable sleeve 54 indicated by a dashed-dotted line in FIG. 2 is the first movable sleeve 54 when the first movable sleeve 54 is moved against the urging force of the first spring 74 beyond the first non-meshing position toward the front wheel 14L.

Figure 3:
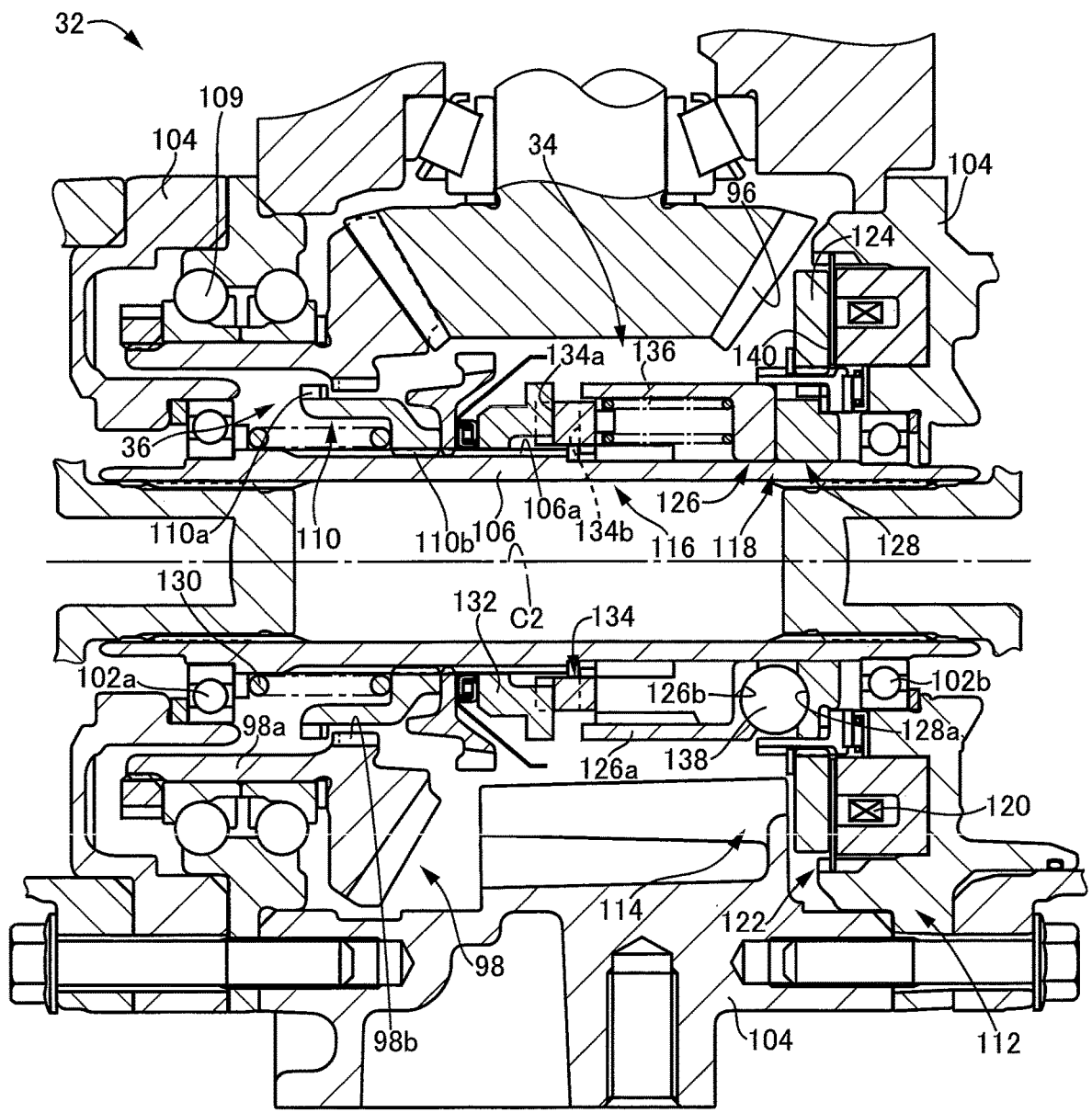
FIG. 3 is a cross-sectional view for explaining a configuration of a second connecting/disconnecting device disposed on the four-wheel drive vehicle of FIG. 1.

As shown in FIGS. 1 and 3, the rear-wheel drive power distributing device 32 includes: a second ring gear (second input rotating member) 98 meshed with a drive pinion 96 disposed integrally with an end portion of the propeller shaft 30 on the side of the rear wheels 16L, 16R in a power transmission path from the propeller shaft 30 to the rear wheels 16L, 16R; a cylindrical center axle (second output rotating member) 106 supported by a second casing 104 of the rear-wheel drive power distributing device 32 via bearings 102a, 102b rotatably around a second rotation axis C2; the left control coupling 38L (see FIG. 1) controlling a transmission torque transmitted from the center axle 106 to a rear wheel axle 108L; the right control coupling 38R (see FIG. 1) controlling a transmission torque transmitted from the center axle 106 to a rear wheel axle 108R; and the second connecting/disconnecting device 34 selectively disconnecting or connecting a power transmission path between the second ring gear 98 and the center axle 106. The center axle 106 is connected to the rear wheels 16L, 16R in a power transmittable manner via the left control coupling 38L and the right control coupling 38R.

For example, when a left coupling drive current Icpl (A) is supplied from the electronic control device 100 to an electromagnetic coil not shown, the left control coupling 38L transmits the transmission torque corresponding to the left coupling drive current (torque command value) Icpl (A), and the left control coupling 38L couples the rear wheel 16L to the center axle 106 in a power transmittable manner when the left coupling drive current Icpl (A) is supplied from the electronic control device 100 to the electromagnetic coil. Similarly, for example, when a right coupling drive current Icpr (A) is supplied from the electronic control device 100 to an electromagnetic coil not shown, the right control coupling 38R transmits the transmission torque corresponding to the right coupling drive current (torque command value) Icpr (A), and the right control coupling 38R couples the rear wheel 16R to the center axle 106 in a power transmittable manner when the right coupling drive current Icpr (A) is supplied from the electronic control device 100 to the electromagnetic coil. Therefore, while the first dog clutch 26 and the second dog clutch 36 are engaged, the left control coupling 38L and the right control coupling 38R adjust the drive power transmitted from the engine 12 to the rear wheels 16L, 16R in accordance with the left coupling drive current Icpl and the right coupling drive current Icpr respectively. The right control coupling 38R is coupled to the rear wheel 16R via the rear wheel axle 108R, and the left control coupling 38L is coupled to the rear wheel 16L via the rear wheel axle 108L. The center axle 106 is disposed between the right control coupling 38R and the left control coupling 38L, i.e., between the rear wheel 16R and the rear wheel 16L, and the center axle 106 is coupled to a coupling cover 38Ra (see FIG. 1) disposed on the right control coupling 38R and a coupling cover 38La (see FIG. 1) disposed on the left control coupling 38L.

As shown in FIG. 3, the cylindrical second ring gear 98 is a bevel gear having helical teeth or a hypoid gear formed thereon, for example. The second ring gear 98 is provided with a shaft portion 98a projected in a substantially cylindrical shape from an inner circumferential portion of the second ring gear 98 toward the rear wheel 16L. For example, the second ring gear 98 has the shaft portion 98a supported by the second casing 104 via a bearing 109 disposed in the second casing 104 and is thereby supported rotatably around the second rotation axis C2 in a cantilevered manner.

As shown in FIG. 3, the cylindrical center axle 106 penetrates through the cylindrical second ring gear 98 so that a portion of the center axle 106 is disposed inside the second ring gear 98. The cylindrical center axle 106 has both end portions supported by a pair of the bearings 102a, 102b disposed in the second casing 104, and the center axle 106 is thereby pivotally supported around the second rotation axis C2, i.e., rotatably supported concentrically with the second ring gear 98.

As shown in FIG. 3, the second dog clutch 36 includes a plurality of second meshing teeth 98b and a cylindrical second movable sleeve 110. The second meshing teeth 98b are formed on the second ring gear 98. The second movable sleeve 110 is provided with a plurality of second meshing teeth 110a that can mesh with the second meshing teeth 98b. The second movable sleeve 110 is provided with inner circumferential meshing teeth 110b meshed with outer circumferential spline teeth 106a formed on the center axle 106. The inner circumferential meshing teeth 110b make the second movable sleeve 110 relatively non-rotatable around the second rotation axis C2 with respect to the center axle 106 and relatively movable in the second rotation axis C2 direction with respect to the center axle 106. The second movable sleeve 110 is configured such that when the second movable sleeve 110 is moved in the second rotation axis C2 direction by a second moving device 112 disposed in the second connecting/disconnecting device 34, the second meshing teeth 110a of the second movable sleeve 110 selectively mesh with the second meshing teeth 98b of the second ring gear 98.

As shown in FIG. 3, the second moving device 112 selectively moves the second movable sleeve 110 in the second rotation axis C2 direction to a second meshing position and a second non-meshing position to selectively engage the second dog clutch 36. The second meshing position is a position at which the second meshing teeth 110a of the second movable sleeve 110 are meshed with the second meshing teeth 98b of the second ring gear 98. At the second meshing position, the second ring gear 98 and the second movable sleeve 110 cannot relatively rotate, and the second dog clutch 36 is engaged. The second non-meshing position is a position at which the second meshing teeth 110a of the second movable sleeve 110 are not meshed with the second meshing teeth 98b of the second ring gear 98. At the second non-meshing position, the second ring gear 98 and the second movable sleeve 110 can relatively rotate, and the second dog clutch 36 is released. Therefore, the second dog clutch 36 connects the power transmission path between the second ring gear 98 and the center axle 106 when the second movable sleeve 110 is moved to the second meshing position by the second moving device 112, and disconnects the power transmission path between the second ring gear 98 and the center axle 106 when the second movable sleeve 110 is moved to the second non-meshing position by the second moving device 112. While the first dog clutch 26, the left control coupling 38L, and the right control coupling 38R are each engaged, the second ring gear 98 is an input rotating member to which a portion of the drive power from the engine 12 toward the front wheels 14L, 14R is input, and the center axle 106 is an output rotating member coupled to the rear wheels 16L, 16R in a power transmittable manner.

As shown in FIG. 3, the second moving device 112 includes a second electromagnetic actuator 114 and a second ratchet mechanism 116. The second electromagnetic actuator 114 includes, for example, a second ball cam 118, a second electromagnetic coil 120, a second auxiliary clutch 122, etc. In the second electromagnetic actuator 114, when a second movable piece 124 is attracted by the second electromagnetic coil 120 and a rotation braking torque is generated in an annular second cam member 128 via the second auxiliary clutch 122 while the center axle 106 is rotating, the annular second cam member 128 and an annular first cam member 126 are relatively rotated to move the first cam member 126 in the second rotation axis C2 direction. The second ball cam 118 includes the first cam member 126 and the second cam member 128, as described below. When the first cam member 126 is moved in the second rotation axis C2 direction by the second electromagnetic actuator 114, the second ratchet mechanism 116 retains a movement position of the second movable sleeve 110 moved in the second rotation axis C2 direction due to the movement of the first cam member 126. The second moving device 112 includes a second spring 130 constantly urging the second movable sleeve 110 from the second non-meshing position toward the second meshing position, i.e., constantly urging the second movable sleeve 110 toward the rear wheel 16L in the second rotation axis C2 direction.

As shown in FIG. 3, the second ratchet mechanism 116 includes an annular first piston 126a, an annular second piston 132, and an annular holder 134 having a plurality of latching teeth, i.e., first meshing teeth 134a and second meshing teeth 134b, in a circumferential direction. The second ratchet mechanism 116 includes a coil spring 136 disposed in a compressed state between the holder 134 and the first cam member 126 so as to constantly urge the first cam member 126 in the direction toward the second cam member 128. The first piston 126a is reciprocated in the second rotation axis C2 direction with a predetermined stroke by the second ball cam 118 due to the second electromagnetic coil 120 attracting the second movable piece 124 and not attracting the second movable piece 124. Therefore, the first piston 126a is reciprocated in the second rotation axis C2 direction with a predetermined stroke by the operation of the second electromagnetic actuator 114. The second piston 132 moves the second movable sleeve 110 to the second non-meshing position against the urging force of the second spring 130 due to the reciprocation of the first piston 126a in the second rotation axis C2 direction. The holder 134 latches the second piston 132 moved by the first piston 126a with any one of the first latching teeth 134a and the second latching teeth 134b. The first piston 126a is disposed on the center axle 106 relatively non-rotatably with respect to the center axle 106, and movably in the second rotation axis C2 direction with respect to the center axle 106. The second piston 132 is disposed on the center axle 106 relatively rotatably with respect to the center axle 106 and movably in the second rotation axis C2 direction with respect to the center axle 106. The holder 134 is disposed on the center axle 106 relatively non-rotatably with respect to the center axle 106 and immovably in the second rotation axis C2 direction with respect to the center axle 106.

As shown in FIG. 3, the second ball cam 118 includes an annular pair of the first cam member 126 and the second cam member 128, and a plurality of spherical rolling elements 138. The first cam member 126 and the second cam member 128 are inserted in an overlapping manner in the second rotation axis C2 direction between the second piston 132 of the second ratchet mechanism 116 and the bearing 102b. The spherical rolling elements 138 are sandwiched between a cam surface 126b formed on the first cam member 126 and a cam surface 128a formed on the second cam member 128. When the first cam member 126 and the second cam member 128 are relatively rotated in the second ball cam 118 configured as described above, the first cam member 126 is separated from the second cam member 128 in the second rotation axis C2 direction. The first cam member 126 is provided with inner circumferential teeth (not shown) meshed with the outer circumferential spline teeth (not shown) formed on the center axle 106. The above-described inner circumferential teeth make the first cam member 126 relatively non-rotatable around the second rotation axis C2 with respect to the center axle 106 and relatively movable in the second rotation axis C2 direction with respect to the center axle 106.

As shown in FIG. 3, the second auxiliary clutch 122 includes the second movable piece 124 described above, and a friction plate 140 disposed between the second movable piece 124 and the second electromagnetic coil 120. The second movable piece 124 is disposed on the second cam member 128 relatively non-rotatably around the second rotation axis C2 with respect to the second cam member 128 and relatively movably in the second rotation axis C2 direction with respect to the second cam member 128.

In the second electromagnetic actuator 114 configured as described above, for example, when a second clutch drive current Ia2 (A) is supplied to the second electromagnetic coil 120 from the electronic control device 100 and the second movable piece 124 is attracted via the friction plate 140 by the second electromagnetic coil 120 while the center axle 106 is rotating, a rotation braking torque is transmitted from the second movable piece 124 to the second cam member 128. Therefore, the first cam member 126 and the second cam member 128 are relatively rotated by the rotation braking torque, and the first piston 126a formed integrally with the first cam member 126 moves toward the rear wheel 16L against the urging forces of the second spring 130 and the coil spring 136 in the second rotation axis C2 direction with respect to the second cam member 128 via the spherical rolling elements 138. When the second clutch drive current Ia2 (A) supplied from the electronic control device 100 to the second electromagnetic coil 120 is reduced and the second movable piece 124 is no longer attracted by the second electromagnetic coil 120, the rotation braking torque is not transmitted to the second cam member 128, and therefore, the second cam member 128 is rotated together with the first cam member 126 via the spherical rolling elements 138 so that the first piston 126a is moved toward the rear wheel 16R by the urging forces of the second spring 130 and the coil spring 136.

When the first piston 126a is reciprocated once in the second rotation axis C2 direction toward the rear wheel 16R and the rear wheel 16L by the second electromagnetic actuator 114 in the second connecting/disconnecting device 34, as shown in FIG. 3, the second movable sleeve 110 is moved via the second ratchet mechanism 116 to the second non-meshing position against the urging force of the second spring 130, and the second piston 132 is latched on the first latching teeth 134a of the holder 134. For example, when the first piston 126a is reciprocated twice by the second electromagnetic actuator 114, i.e., when the first piston 126a is further reciprocated once while the second movable sleeve 110 is at the second non-meshing position in the second connecting/disconnecting device 34, the second piston 132 is unlatched from the first latching teeth 134a of the holder 134, and when the second piston 132 is latched on the second latching teeth 134b of the holder 134, the second movable sleeve 110 is moved to the second meshing position by the urging force of the second spring 130.

In the four-wheel drive vehicle 10 configured as described above, when the electronic control device 100 determines that a 2WD switching request is made, for example, the first dog clutch 26 and the second dog clutch 36 are each brought into a released state to form a two-wheel drive state in which the drive power is transmitted from the engine 12 via the front-wheel drive power distributing device 20 to the front wheels 14L, 14R. In the two-wheel drive state, the first dog clutch 26 and the second dog clutch 36 are each released to form a disconnect state in which the propeller shaft 30 interrupts the power transmission from the engine 12 and the rear wheels 16L, 16R. In the four-wheel drive vehicle 10, when the electronic control device 100 determines that a 4WD switching request is made, the first dog clutch 26 and the second dog clutch 36 are each brought into an engaged state, and the left control coupling 38L and the right control coupling 38R are each brought into an engaged state to form a four-wheel drive state in which the drive power is transmitted from the engine 12 via the front-wheel drive power distributing device 20 to the front wheels 14L, 14R and the drive power is also transmitted from the engine 12 via the propeller shaft 30 etc. to the rear wheels 16L, 16R.

As shown in FIG. 1, the electronic control device 100 is configured to include a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the four-wheel drive vehicle 10. The electronic control device 100 is supplied with various input signals detected by sensors disposed on the four-wheel drive vehicle 10. For example, the signals input to the electronic control device 100 include: signals indicative of wheel speeds W (rpm), i.e., wheel speeds Wfl, Wfr, Wrl, Wrr (rpm) of the front wheels 14L, 14R and the rear wheels 16L, 16R, detected by a wheel speed sensor 150; a signal indicative of a vehicle speed V (km/h) detected by a vehicle speed sensor 152; a signal indicative of an accelerator opening degree θacc detected by an accelerator opening degree sensor 154; a signal indicative of a yaw rate Ryaw that is a rotation angular speed around a vertical axis of the vehicle 10 detected by a yaw rate sensor 156; and a signal indicative of a steering angle θsw of a steering wheel detected by a steering sensor 158.

Various output signals are supplied from the electronic control device 100 to devices disposed on the four-wheel drive vehicle 10. For example, the signals supplied from the electronic control device 100 to the portions include: the first clutch drive current Ia1 (A) supplied to the first electromagnetic coil 64 of the first electromagnetic actuator 58 for controlling the first dog clutch 26, i.e., for switching the first dog clutch 26 to the engaged state or a released state; the second clutch drive current Ia2 (A) supplied to the second electromagnetic coil 120 of the second electromagnetic actuator 114 for controlling the second dog clutch 36, i.e., for switching the second dog clutch 36 to the engaged state or a released state; the left coupling drive current Icpl (A) supplied to the electromagnetic coil (not shown) of the left control coupling 38L for controlling the transmission torque transmitted between the rear wheel 16L and the center axle 106; and the right coupling drive current Icpr (A) supplied to the electromagnetic coil (not shown) of the right control coupling 38R for controlling the transmission torque transmitted between the rear wheel 16R and the center axle 106.

As shown in FIG. 1, the electronic control device 100 includes a drive state switching portion 160, and the drive state switching portion 160 includes, for example, a road surface state determining portion 162, a switching request output portion 164, and a road surface state redetermining portion 166, a coupling control portion 168, and a clutch control portion 170.

The road surface state determining portion 162 determines whether a running road surface is a relatively low friction road, i.e., a low μ road, or a high friction road, i.e., a high μ road, during vehicle running. For example, when a difference between a vehicle body speed Ws (rpm) and the wheel speed W (rpm) becomes larger than a preset slip determination value where the wheel speed W is one of the wheel speeds WFl, Wfr, Wrl, Wrr whose difference from the vehicle body speed Ws (rpm) is the largest, the road surface state determining portion 162 determines that the road surface state is the low μ road. The vehicle body speed Ws (rpm) is calculated by using a preset equation from the wheel speeds Wfl, Wfr, Wrl, Wrr (rpm) detected by the wheel speed sensor 150. The road surface state determining portion 162 can relatively accurately determine whether the running road surface is the low μ road or the high μ road when the drive power is transmitted from the wheels 14, 16 to the running road surface during vehicle running; however, for example, if the drive power is not transmitted from the wheels 14, 16 to the running road surface during coasting or deceleration running of the vehicle 10, the road surface state determining portion 162 may determine the running road surface as the high μ road even though the running road surface is actually the low μ road.

The switching request output portion 164 outputs a request for switching to the two-wheel drive state, i.e., the 2WD switching request, or a request for switching to the four-wheel drive state, i.e., the 4WD switching request. For example, when the road surface state determining portion 162 determines that the running road surface is the low μ road, the switching request output portion 164 outputs the 4WD switching request based on the determination. When the road surface state determining portion 162 determines that the running road surface is the high μ road and the vehicle is in a steady running state in which a drive power change of the vehicle 10 calculated from the accelerator opening degree θacc, vehicle speed V, etc. is smaller than a preset drive power change threshold value, the switching request output portion 164 outputs the 2WD switching request. Therefore, the switching request output portion 164 outputs the 4WD switching request or the 2WD switching request depending on a determination whether the running road surface is the low μ road or the high μ road according to the road surface state determining portion 162.

When the switching request output portion 164 outputs the 2WD switching request, the drive state switching portion 160 switches the drive state of the four-wheel drive vehicle 10 from the four-wheel drive state to the two-wheel drive state. When the drive state is the two-wheel drive state and the switching request output portion 164 outputs the 2WD switching request, the drive state switching portion 160 maintains the drive state. When the switching request output portion 164 outputs the 4WD switching request, the drive state switching portion 160 switches the drive state of the four-wheel drive vehicle 10 from the two-wheel drive state to the four-wheel drive state. When the drive state is the four-wheel drive state and the switching request output portion 164 outputs the 4WD switching request, the drive state switching portion 160 maintains the drive state.

The road surface state redetermining portion 166 includes a storage portion 166a.

When the switching request output portion 164 outputs the 2WD switching request, the storage portion 166a calculates a slip ratio S and a yaw rate deviation ΔRyaw and stores the calculated slip ratio S and yaw rate deviation ΔRyaw as a slip ratio Sp and a yaw rate deviation ΔRyawp, respectively. Therefore, the storage portion 166a calculates each of the slip ratio S and the yaw rate deviation ΔRyaw when the drive state is the four-wheel drive state, and stores each of the calculated slip ratio S and yaw rate deviation ΔRyaw.

The slip ratio S is calculated by using the wheel speeds Wfl, Wfr, Wrl, Wrr detected by the wheel speed sensor 150 when the switching request output portion 164 outputs the 2WD switching request, for example, from Eq. (1):

$$S=(W-Ws)/Ws \quad (1).$$

In Eq. (1), "Ws" is the vehicle body speed Ws described above, and "W" is the wheel speed W having a largest difference from the vehicle body speed Ws among the wheel speeds Wfl, Wfr, Wrl, Wrr.

The yaw rate deviation ΔRyaw is calculated by using the yaw rate Ryaw detected from the yaw rate sensor 156, the vehicle speed V detected from the vehicle speed sensor 152, and steering angle θsw detected from the steering sensor 158 when the switching request output portion 164 outputs the 2WD switching request, for example, from Eq. (2):

$$\Delta Ryaw=Ryaw-Ryawtgt \quad (2).$$

"Ryawtgt" described in the Eq. (2) is a target yaw rate calculated based on the vehicle speed V, the steering angle θsw, etc.

When the switching request output portion 164 outputs the 2WD switching request and the storage portion 166a stores each of the slip ratio Sp and the yaw rate deviation ΔRyawp, the coupling control portion 168 stops the supply of the left coupling drive current Icpl supplied to the electromagnetic coil of the left control coupling 38L and stops the supply of the right coupling drive current Icpr supplied to the electromagnetic coil of the right control coupling 38R, i.e., cuts off the energization to the left control coupling 38L and the right control coupling 38R, so as to temporarily release the left control coupling 38L and the right control coupling 38R, respectively, to bring the drive state into the two-wheel drive state in which the drive power from the engine 12 is distributed only to the front wheels 14L, 14R.

When the switching request output portion 164 outputs the 2WD switching request, the road surface state redetermining portion 166 calculates each of the slip ratio S and the yaw rate deviation ΔRyaw to redetermine whether the running road surface is the low μ road or the high μ road for reconfirmation based on the calculated slip ratio S and yaw rate deviation ΔRyaw as well as the slip ratio Sp and the yaw rate deviation ΔRyawp stored in the storage portion 166a while the energization to the left control coupling 38L and the right control coupling 38R is temporarily cut off by the coupling control portion 168. For example, the road surface state redetermining portion 166 calculates the slip ratio S when the left control coupling 38L and the right control coupling 38R are released, i.e., during the two-wheel drive state, and redetermines that the running road surface is the low μ road if the calculated slip ratio S becomes equal to or greater than a threshold value Sa or redetermines that the running road surface is the high μ road if the calculated slip ratio S is smaller than the threshold value Sa during a preset first time tc1. The threshold value Sa is a slip ratio determination value for determining whether the running road surface is the low μ road or the high μ road, and the threshold value Sa is calculated by using, for example, a map stored in advance from the slip ratio Sp stored in the storage portion 166a. For example, the road surface state redetermining portion 166 calculates the yaw rate deviation ΔRyaw while the left control coupling 38L and the right control coupling 38R are released, i.e., during the two-wheel drive state, and redetermines that the running road surface is the low μ road if a change amount H (ΔRyaw−ΔRyawp) between the calculated yaw rate deviation ΔRyaw and the yaw rate deviation ΔRyawp stored in the storage portion 166a becomes equal to or greater than a predetermined change amount (determination value) H1 set in advance, or redetermines that the running road surface is the high μ road if the change amount H is smaller than the predetermined change amount H1 during a preset second time tc2. The predetermined change amount H1 is a yaw rate deviation determination value for determining whether the running road surface is the low μ road or the high μ road. Concretely, the road surface redetermining portion 166 redetermines that the running road surface is the low μ road when at least one redetermination result that the running road surface is the low μ road is obtained by redeterminations using the slip ratio S and the yaw rate deviation ΔRyaw.

When the road state redetermining portion 166 redetermines that the running road surface is the low μ road, the drive state switching portion 160 prohibits switching the four-wheel drive vehicle 10 from the four-wheel drive state to the two-wheel drive state.

When the road surface state redetermining portion 166 redetermines that the running road surface is the low μ road, the coupling control portion 168 supplies the left coupling drive current Icpl to the electromagnetic coil of the left control coupling 38L and supplies the right coupling drive current Icpr to the electromagnetic coil of the right control coupling 38R so as to engage the left control coupling 38L and the right control coupling 38R, respectively, to bring the drive state into the four-wheel drive state.

When the road surface state redetermining portion 166 redetermines that the running road surface is the low μ road, the road surface state determining portion 162 corrects the running road surface once determined by the road surface state determining portion 162 from the high μ road to the low μ road. When the running road surface once determined by the road surface state determining portion 162 is corrected from the high μ road to the low μ road, the switching request output portion 164 outputs the 4WD switching request.

When the road surface state redetermining portion 166 redetermines that the running road surface is the high μ road, the clutch control portion 170 controls the first clutch drive current Ia1 (A) supplied to the first electromagnetic coil 64 of the first electromagnetic actuator 58 and the second clutch drive current Ia2 (A) supplied to the second electromagnetic coil 120 of the second electromagnetic actuator 114 so that the first dog clutch 26 and the second dog clutch 36 are each switched from the engaged state to the released state.

Figure 4:
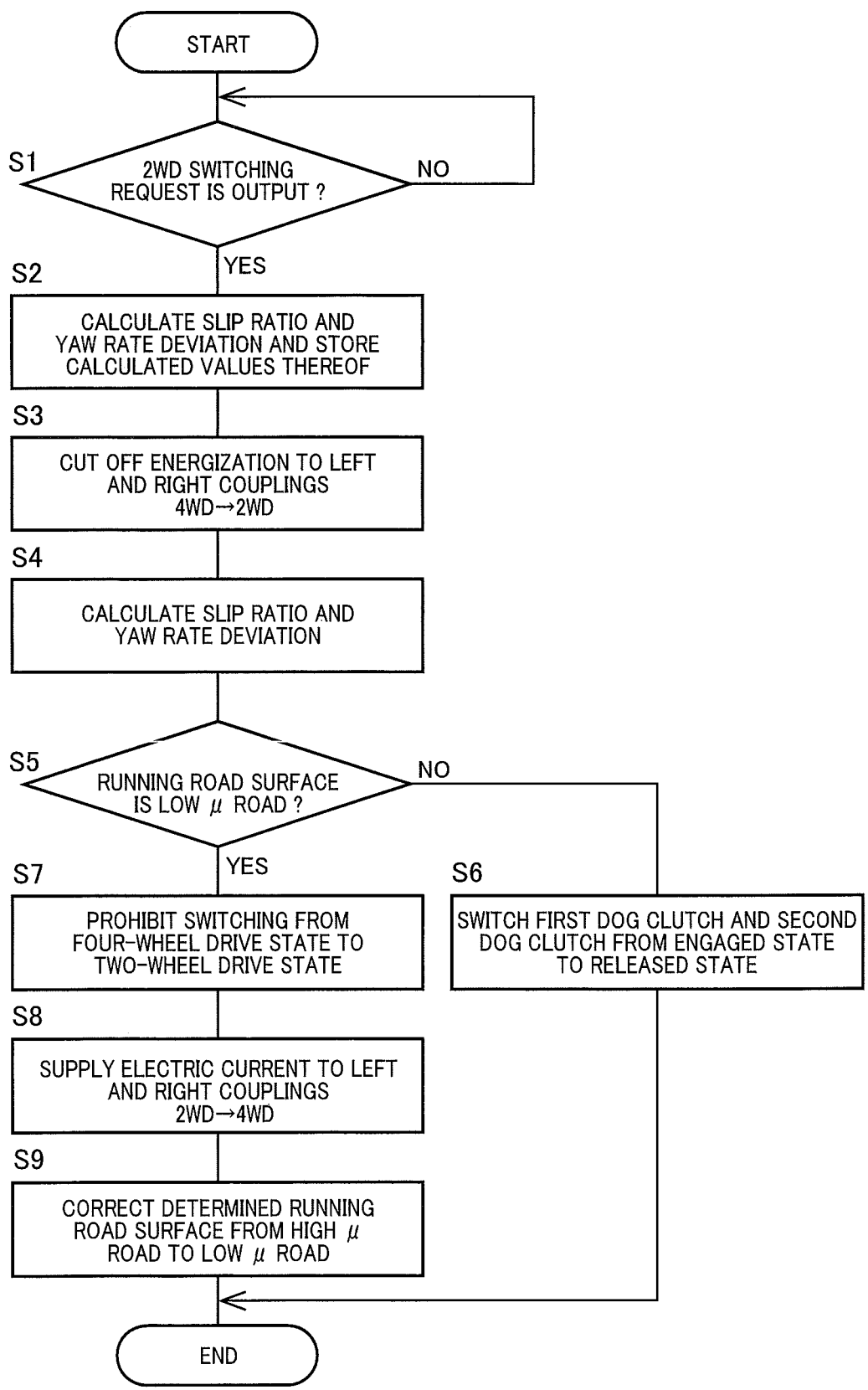
FIG. 4 is a flowchart of an electronic control device of FIG. 1 for explaining an example of a control operation of a switching control i.e. switching a drive state of the vehicle from a four-wheel drive state to a two-wheel drive state during running in the four-wheel drive state when it is determined that a running road surface is a high μ road.
Figure 5:
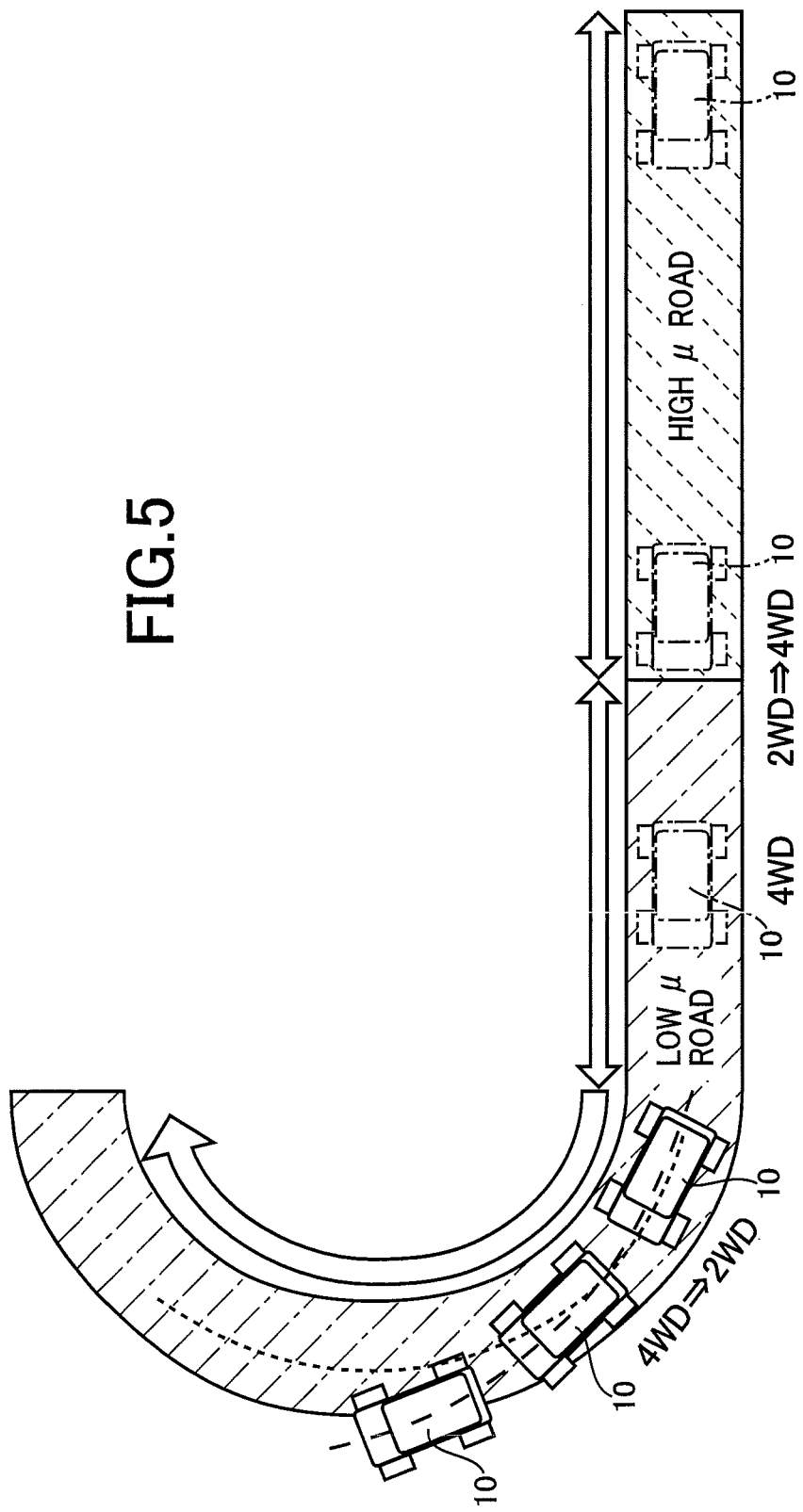
FIG. 5 is a view showing a four-wheel drive vehicle making a turn in the four-wheel drive state when it is determined the running road surface is a high μ road even though the running road surface is actually a low μ road.
Figure 6:
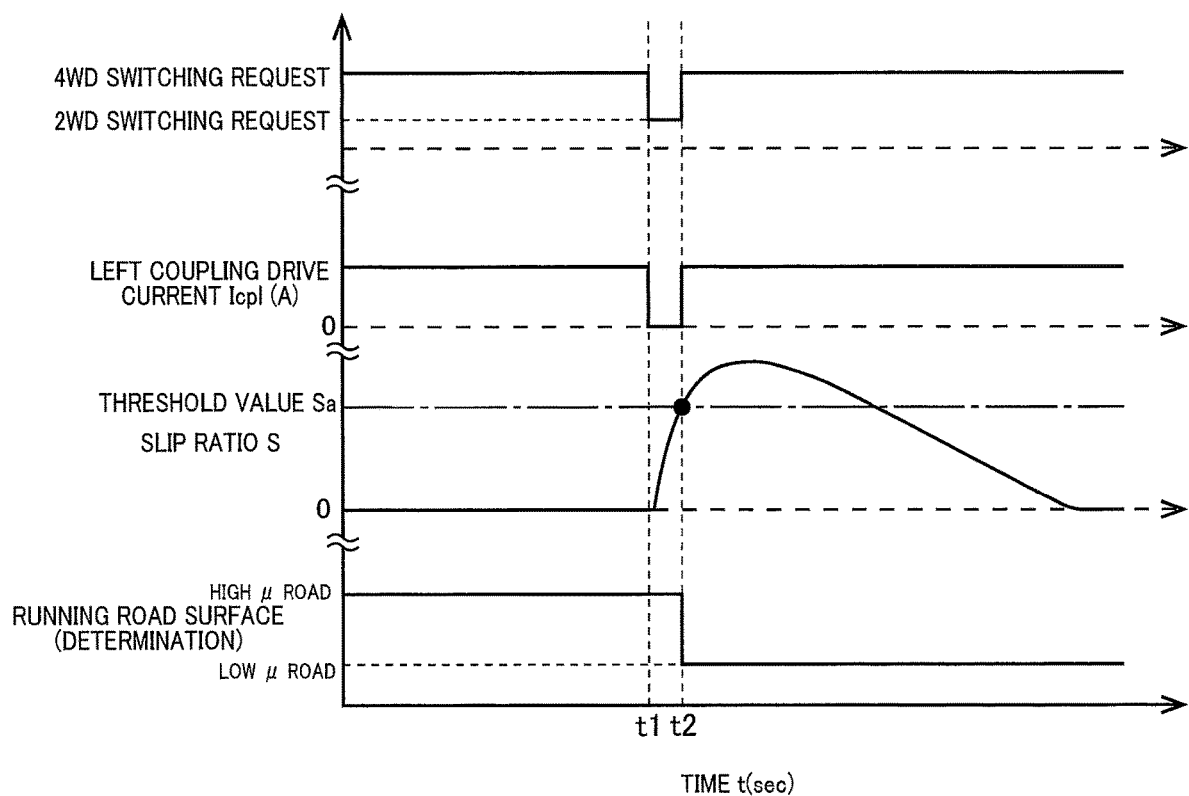
FIG. 6 is a time chart in the case of performing the control operation along the flowchart of FIG. 4, i.e., the control operation of the switching control from the four-wheel drive state to the two-wheel drive state while the vehicle is making a turn in the four-wheel drive state when it is determined that the running road surface is the high μ road even though the running road surface is actually the low μ road as shown in FIG. 5.

FIG. 4 is a flowchart of the electronic control device 100 for explaining an example of a control operation of a switching control i.e. switching the drive state of the vehicle 10 from the four-wheel drive state to the two-wheel drive state during running in the four-wheel drive state when it is determined that the running road surface is the high μ road. FIG. 6 is a time chart in the case of performing the control operation along the flowchart of FIG. 4, i.e., the control operation of the switching control from the four-wheel drive state to the two-wheel drive state while the vehicle 10 is making a turn in the four-wheel drive state when it is determined that the running road surface is the high μ road even though the running road surface is actually the low μ road as shown in FIG. 5.

First, at step (hereinafter, step will be omitted) S1 corresponding to the function of the switching request output portion 164, it is determined whether the 2WD switching request is output. If the determination of S1 is negative, i.e., if the 4WD switching request is output, S1 is executed again, and if the determination of S1 is affirmative (at time t1 of FIG. 6), S2 corresponding to the function of the storage portion 166a is executed. At S2, the slip ratio S and the yaw rate deviation ΔRyaw are each calculated, and the calculated slip ratio S and yaw rate deviation ΔRyaw are stored as the slip ratio Sp and the yaw rate deviation ΔRyawp, respectively.

At S3 corresponding to the function of the coupling control portion 168, the energization to each of the left control coupling 38L and the right control coupling 38R is cut off so as to temporarily release the left control coupling 38L and the right control coupling 38R, respectively. At S4 corresponding to the function of the road surface state redetermining portion 166, the slip ratio S and the yaw rate deviation ΔRyaw are each calculated.

At S5 corresponding to the function of the road surface state redetermining portion 166, it is redetermined whether the running road surface is the low μ road based on the slip ratio S and the yaw rate deviation ΔRyaw calculated at S4 and the slip ratio S and the yaw rate deviation ΔRyaw stored at S2. If the determination of S5 is negative, i.e., if the running road surface is the high μ road, S6 corresponding to the function of the clutch control portion 170 is executed, and if the determination of S5 is affirmative (at time t2 of FIG. 6), S7 corresponding to the function of the drive state switching portion 160 is executed. At S6, the first dog clutch 26 and the second dog clutch 36 are each switched from the engaged state to the released state for switching from the four-wheel drive state to the two-wheel drive state.

At S7, switching from the four-wheel drive state to the two-wheel drive state is prohibited. Subsequently, at S8 corresponding to the function of the coupling control portion 168, the left coupling drive current Icpl is supplied to the electromagnetic coil of the left control coupling 38L and the right coupling drive current Icpr is supplied to the electromagnetic coil of the right control coupling 38R so as to engage the left control coupling 38L and the right control coupling 38R, respectively. The left control coupling 38L and the right control coupling 38R are respectively engaged so that the drive state is switched to the four-wheel drive state. Subsequently, at S9 corresponding to the function of the road surface state determining portion 162, the determined running road surface is corrected from the high μ road to the low μ road.

As described above, according to the four-wheel drive vehicle 10 of this example, in the case of switching the drive state from the four-wheel drive state to the two-wheel drive state, the left control coupling 38L and the right control coupling 38R are temporarily released to redetermine whether the running road surface is the low μ road or the high μ road before releasing the first dog clutch 26 and the second dog clutch 36, and when it is redetermined that the running road surface is the low μ road, switching from the four-wheel drive state to the two-wheel drive state is prohibited. Since, the left control coupling 38L and the right control coupling 38R are switched quicker than the first dog clutch 26 and the second dog clutch 36 between the engaged state and the released state, the left control coupling 38L and the right control coupling 38R are temporarily released to establish the two-wheel drive state in which the drive power from the engine 12 is distributed only to the front wheels 14L, 14R and to redetermine whether the running road surface is the low μ road or the high μ road, and when it is redetermined that the running road surface is the low μ road, switching from the four-wheel drive state to the two-wheel drive state is prohibited, so that inappropriate release of the first dog clutch 26 and the second dog clutch 36 is suitably prevented when the running road surface is the low μ road.

According to the four-wheel drive vehicle 10 of this example, the vehicle 10 includes the first dog clutch 26 selectively disconnecting or connecting the power transmission path between the input shaft 42 to which a portion of the drive power from the engine 12 toward the front wheels 14L, 14R is input and the first ring gear 46 coupled via the propeller shaft 30 to the rear wheels 16L, 16R, and the second dog clutch 36 selectively disconnecting or connecting the power transmission path between the second ring gear 98 coupled to the propeller shaft 30 and the center axle 106 coupled to the rear wheels 16L, 16R, with the left control coupling 38L and the right control coupling 38R disposed on the power transmission path between the center axle 106 and the rear wheels 16L, 16R, and the electronic control device 100 provides the switching control between the four-wheel drive state in which the first dog clutch 26 and the second dog clutch 36 are each brought into the engaged state while the left control coupling 38L and the right control coupling 38R are each brought into the engaged state and the two-wheel drive state in which the first dog clutch 26 and the second dog clutch 36 are each brought into the released state. Therefore, during the two-wheel drive state, the first dog clutch 26 and the second dog clutch 36 are each released, and the propeller shaft 30 interrupts the power transmission from the engine 12 and the power transmission from the rear wheels 16L, 16R.

According to the four-wheel drive vehicle 10 of this example, in the case of redetermining whether the running road surface is the low μ road or the high μ road, the electronic control device 100 redetermines that the running road surface is the low μ road when the change amount H exceeds the predetermined change amount H1 set in advance between the yaw rate deviation ΔRyawp before temporarily releasing the left control coupling 38L and the right control coupling 38R and the yaw rate deviation ΔRyaw when the left control coupling 38L and the right control coupling 38R are temporarily released. Therefore, it can suitably be redetermined whether the running road surface is the low μ road or the high μ road.

According to the four-wheel drive vehicle 10 of this example, the left control coupling 38L and the right control coupling 38R are respectively coupled to the rear wheels 16L, 16R. Therefore, the present invention can suitably be applied to the four-wheel drive vehicle including the left-and-right pair of the left control coupling 38L and the right control coupling 38R for the rear wheels 16L, 16R.

According to the four-wheel drive vehicle 10 of this example, the main drive wheels are the front wheels 14L, 14R, and the sub-drive wheels are the rear wheels 16L, 16R. Therefore, the present invention can suitably be applied to an FF (front-engine front-wheel drive) type four-wheel drive vehicle.

Other examples of the present invention will be described in detail with reference to the drawings. In the following description, the portions common to the examples are denoted by the same reference numerals and will not be described.

Second Example

Figure 7:
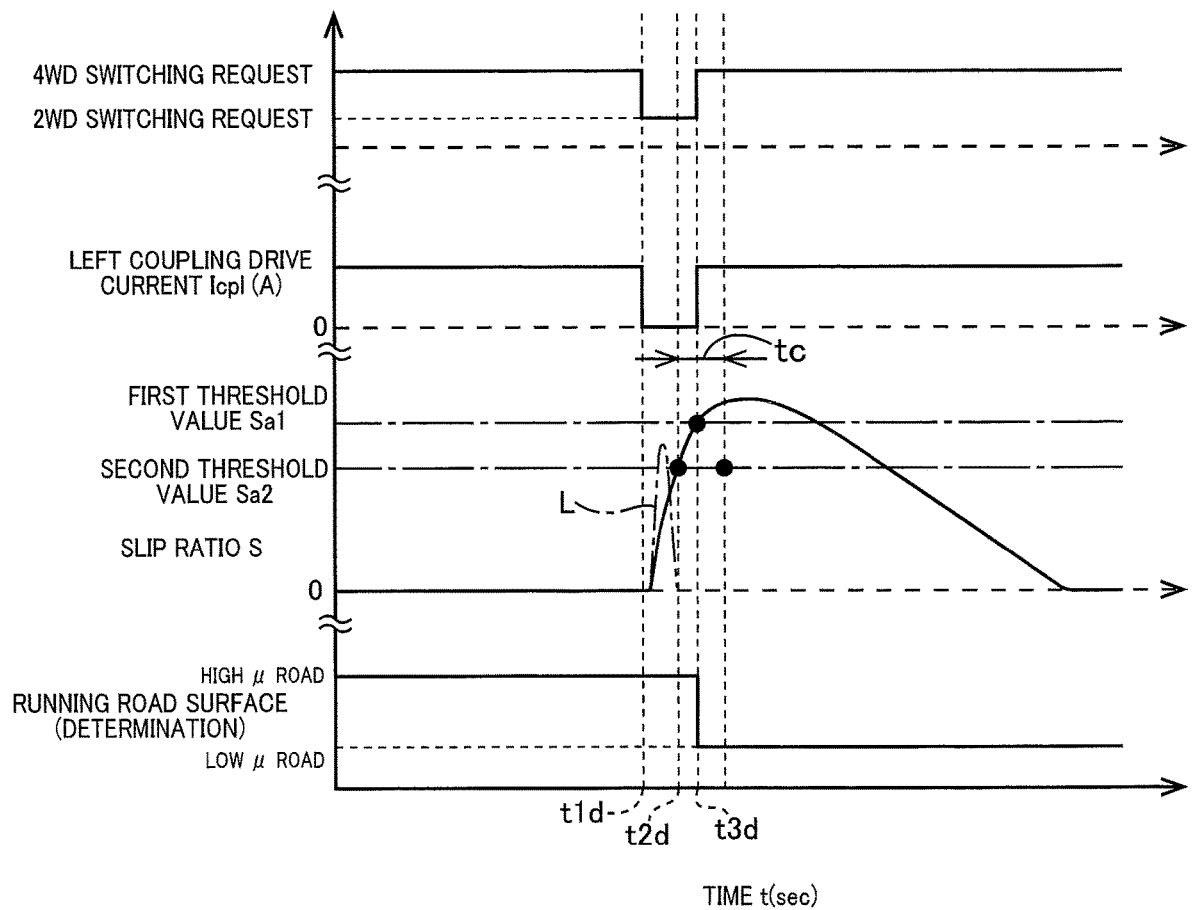
FIG. 7 is a time chart in a case of performing another example of control operation different from that of FIG. 6 when it is determined that the running road surface is a high μ road even though the running road surface is actually a low μ road.

FIG. 7 is a time chart in a case of performing another example of control operation of switching control from the four-wheel drive state to the two-wheel drive state when it is determined that the running road surface is a high μ road even though the running road surface is actually the low μ road, and the vehicle 10 is making a turn in the four-wheel drive state. As compared to the four-wheel drive vehicle 10 of the first example, the four-wheel drive vehicle of this example is substantially the same as the four-wheel drive vehicle 10 of the first example except that the method of redetermining whether the running road surface is the high μ road or the low μ road by using the slip ratio S is different from that in the road surface state redetermining portion 166 included in the electronic control device 100 of the first example.

Specifically, the road surface state redetermining portion 166 calculates the slip ratio S while the left control coupling 38L and the right control coupling 38R are released, and redetermines that the running road surface is the low μ road when the calculated slip ratio S becomes equal to or larger than a first threshold value Sa1 as shown in FIG. 7. The road surface state redetermining portion 166 calculates the slip ratio S while the left control coupling 38L and the right control coupling 38R are released, and redetermines that the running road surface is the low μ road when the calculated slip ratio S exceeds a second threshold value Sa2 set smaller than the first threshold value Sa1 and the slip ratio S exceeds the second threshold value Sa2 for a time longer than a predetermined time tc set in advance. The predetermined time tc is a time (sec) obtained in advance by an experiment etc. to prevent an erroneous redetermination that the running road surface is the low μ road even if a spike-shaped slip occurs and causes the slip ratio S temporarily exceeding the second threshold value Sa2 during the vehicle 10 running on the high μ road and passing through unevenness, for example. In FIG. 7, the spike-shaped slip is indicated by a dashed-dotted line L. The first threshold value Sa1 is a magnitude of the slip ratio S set sufficiently larger than the slip ratio S of the spike-shaped slip, for example. The first threshold value Sa1 is decided by using, for example, a map stored in the storage portion 166a in advance and the slip ratio Sp before the left control coupling 38L and the right control coupling 38R are temporarily released, for example. The road surface state redetermining portion 166 calculates the slip ratio S while the left control coupling 38L and the right control coupling 38R are released, and redetermines that the running road surface is the high μ road when the calculated slip ratio S is smaller than the second threshold value Sa2 during the preset first time tc1.

As shown in FIG. 7, even if the spike-shaped slip indicated by the dashed-dotted line L occurs, the slip ratio S only temporarily exceeds the second threshold value Sa2, so that an erroneous redetermination can be avoided that the running road surface is the low μ road even when the running road surface is the high μ road and the vehicle passes through unevenness. If the slip ratio S exceeds the first threshold value Sa1 sufficiently larger than the slip ratio S of the spike-shaped slip, the running road surface is redetermined as the low μ road even though the predetermined time tc has not elapsed. Time t1d shown in FIG. 7 is a time point when a request for switching to the two-wheel drive state, i.e., the 2WD switching request, is output, time t2d shown in FIG. 7 is a time point when the slip ratio S exceeds the second threshold value Sa2, and time t3d shown in FIG. 7 is a time point when the slip ratio S exceeds the first threshold value Sa1.

As described above, according to the four-wheel drive vehicle of this example, in the case of redetermining whether the running road surface is the low μ road or the high μ road, the electronic control device 100 redetermines that the running road surface is the low μ road when the slip ratio S exceeds the preset first threshold value Sa1 or when the slip ratio S exceeds the second threshold value Sa2 set smaller than the first threshold value Sa1 and the slip ratio S exceeds the second threshold value Sa2 for a time longer than the predetermined time tc. Therefore, for example, even if a spike-shaped slip occurs and causes the slip ratio S temporarily exceeding the second threshold value Sa2 when the running road surface is the high μ road and the vehicle passes through unevenness, an erroneous redetermination can be avoided that the running road surface is the low μ road. If the slip ratio S exceeds the first threshold value Sa1 and it can be determined that the running road surface is the low μ road, the running road surface is redetermined as the low μ road even though the predetermined time tc has not elapsed, so that the time required for redetermining the running road surface as the low μ road can suitably be shortened.

According to the four-wheel drive vehicle of this example, the first threshold value Sa1 is decided based on the slip ratio S before each of the right control coupling 38R and the left control coupling 38L is temporarily released. Therefore, whether the running road surface is the low μ road can accurately be redetermined in a short time.

Third Example

Figure 8:
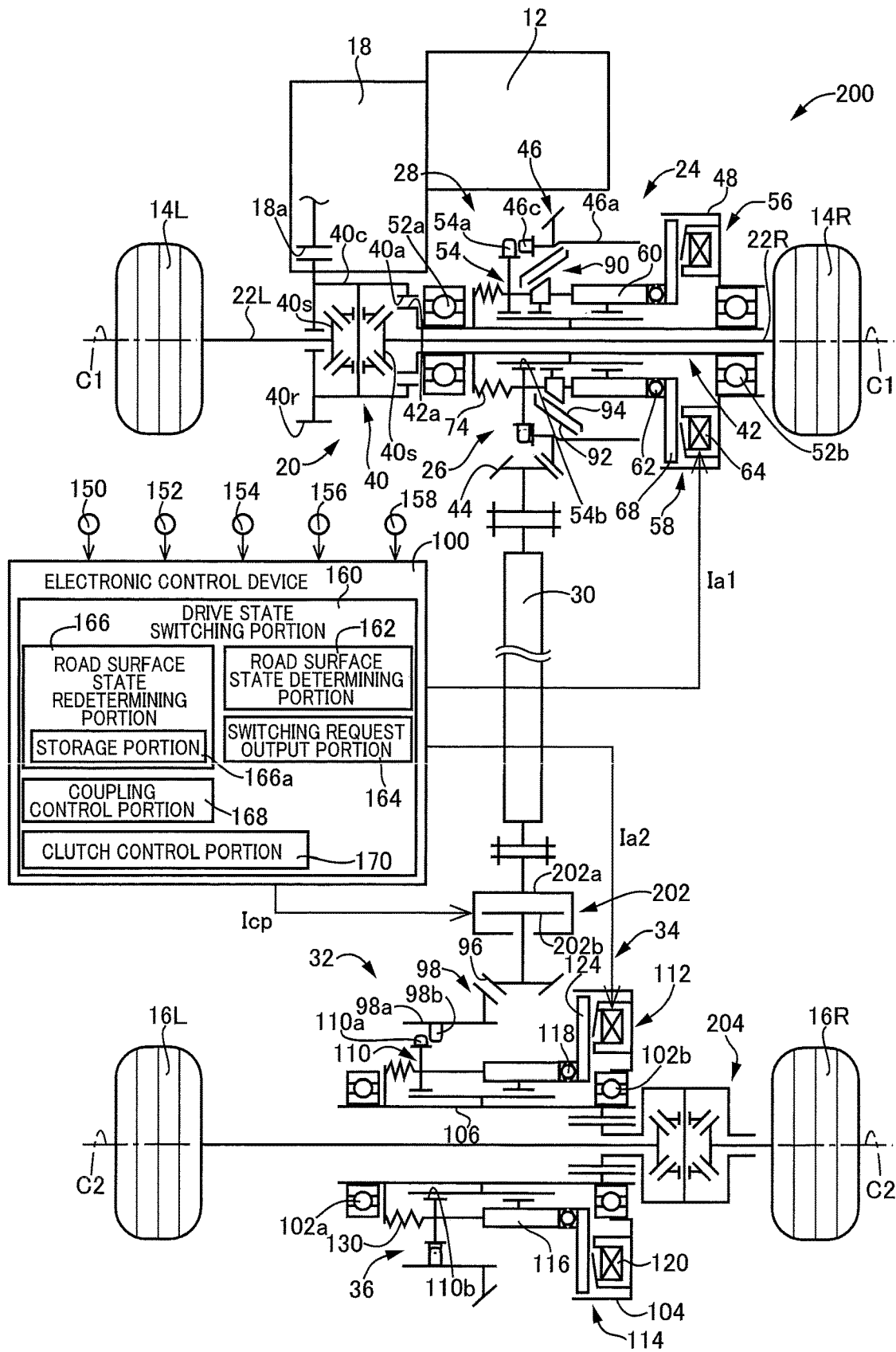
FIG. 8 is a diagram for explaining a control device of a four-wheel drive vehicle of still another example, i.e., a third example, of the present invention.

FIG. 8 is a diagram for explaining a four-wheel drive vehicle 200 according to another example of the present invention. As compared to the four-wheel drive vehicle 10 of the first example, the four-wheel drive vehicle 200 of this example is substantially the same as the four-wheel drive vehicle 10 of the first example except that the left control coupling 38L and the right control coupling 38R are not provided, that an electronically controlled coupling 202 is disposed on a power transmission path between the propeller shaft 30 and the drive pinion 96, that a differential device 204 is disposed on the power transmission path between the center axle 106 and the rear wheels 16L, 16R, and that the function of the coupling control portion 168 included in the electronic control device 100 is changed. In the four-wheel drive vehicle 200, when the electronic control device 100 determines that the 2WD switching request is made, for example, the first dog clutch 26 and the second dog clutch 36 are each brought into the released state to form the two-wheel drive state. In the four-wheel drive vehicle 200, when the electronic control device 100 determines that the 4WD switching request is made, the first dog clutch 26 and the second dog clutch 36 are each brought into the engaged state and the electronically controlled coupling 202 is brought into an engaged state to form the four-wheel drive state.

The electronically controlled coupling 202 includes a clutch drum 202a coupled to the propeller shaft 30 in a power transmittable manner and a clutch hub 202b coupled to the drive pinion 96 in a power transmittable manner so that the electronically controlled coupling 202 adjusts a drive torque from the propeller shaft 30 to the second ring gear 98, i.e., the torque transmitted from the engine 12 to the rear wheels 16L, 16R with the first dog clutch 26 and the second dog clutch 36 each engaged. Although not shown, the electronically controlled coupling 202 is, for example, an electromagnetic coupling including both an electrically controllable actuator that includes an electromagnetic coil and a ball cam and a wet multiplate clutch whose friction force, i.e., fastening force, between an input-side friction member (not shown) disposed on the clutch drum 202a and an output-side friction member (not shown) disposed on the clutch hub 202b is adjusted by the actuator, so that a magnetic force generated by a coupling drive current Icp supplied from the electronic control device 100 to the electromagnetic coil increases the fastening force between the input-side friction member and the output-side friction member, i.e., increases the engagement torque of the electronically controlled coupling 202, so as to adjust the drive power transmitted to the rear wheels 16L, 16R.

When the switching request output portion 164 outputs the 2WD switching request and the storage portion 166a stores each of the slip ratio Sp and the yaw rate deviation ΔRyawp, the coupling control portion 168 stops the supply of the coupling drive current Icp supplied to the electromagnetic coil of the electronically controlled coupling 202, i.e., cuts off the energization to the electronically controlled coupling 202, so as to temporarily release the electronically controlled coupling 202 to bring the drive state into the two-wheel drive state in which the drive power from the engine 12 is distributed only to the front wheels 14L, 14R.

When the road surface state redetermining portion 166 redetermines that the running road surface is the low μ road, the coupling control portion 168 supplies the coupling drive current Icp to the electromagnetic coil of the electronically controlled coupling 202 so as to engage the electronically controlled coupling 202 to bring the drive state into the four-wheel drive state.

According to the above-described four-wheel drive vehicle 200, in the case of switching the drive state from the four-wheel drive state to the two-wheel drive state, the electronically controlled coupling 202 is temporarily released to redetermine whether the running road surface is the low μ road or the high μ road before releasing the first dog clutch 26 and the second dog clutch 36, and when it is redetermined that the running road surface is the low μ road, switching from the four-wheel drive state to the two-wheel drive state is prohibited. Therefore, in the four-wheel drive vehicle 200, the same effects as the four-wheel drive vehicle 10 of the first example can be obtained. Specifically, in the four-wheel drive vehicle 200, inappropriate release of the first dog clutch 26 and the second dog clutch 36 is suitably prevented when the running road surface is actually the low μ road.

Fourth Example

Figure 9:
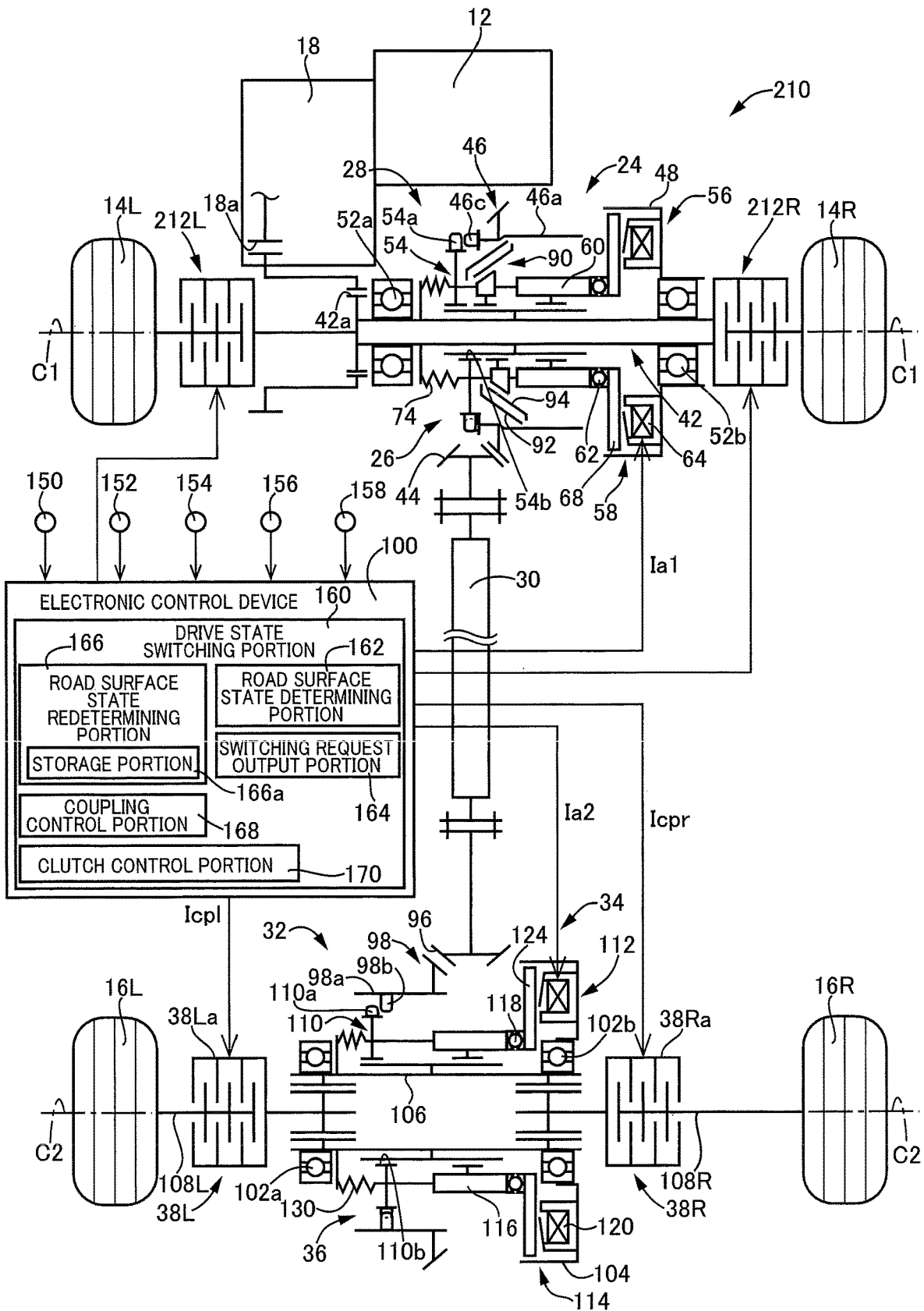
FIG. 9 is a diagram for explaining a control device of a four-wheel drive vehicle of still another example, i.e., a fourth example, of the present invention.

FIG. 9 is a diagram for explaining a four-wheel drive vehicle 210 according to another example of the present invention. As compared to the four-wheel drive vehicle 10 of the first example, the four-wheel drive vehicle 210 of this example is substantially the same as the four-wheel drive vehicle 10 of the first example except that the first differential device 40 is removed, that a left control coupling 212L is disposed on a power transmission path between the input shaft 42 and the front wheel 14L, and that a right control coupling 212R is disposed on a power transmission path between the input shaft 42 and the front wheel 14R.

According to the above-described four-wheel drive vehicle 210, in the case of switching the drive state from the four-wheel drive state to the two-wheel drive state, the left control coupling 38L and the right control coupling 38R are temporarily released to redetermine whether the running road surface is the low µ road or the high µ road before releasing the first dog clutch 26 and the second dog clutch 36, and when it is redetermined that the running road surface is the low µ road, switching from the four-wheel drive state to the two-wheel drive state is prohibited. Therefore, in the four-wheel drive vehicle 210, the same effects as the four-wheel drive vehicle 10 of the first example can be obtained. Specifically, in the four-wheel drive vehicle 210, inappropriate release of the first dog clutch 26 and the second dog clutch 36 is suitably prevented when the running road surface is actually the low µ road.

Fifth Example

Figure 10:
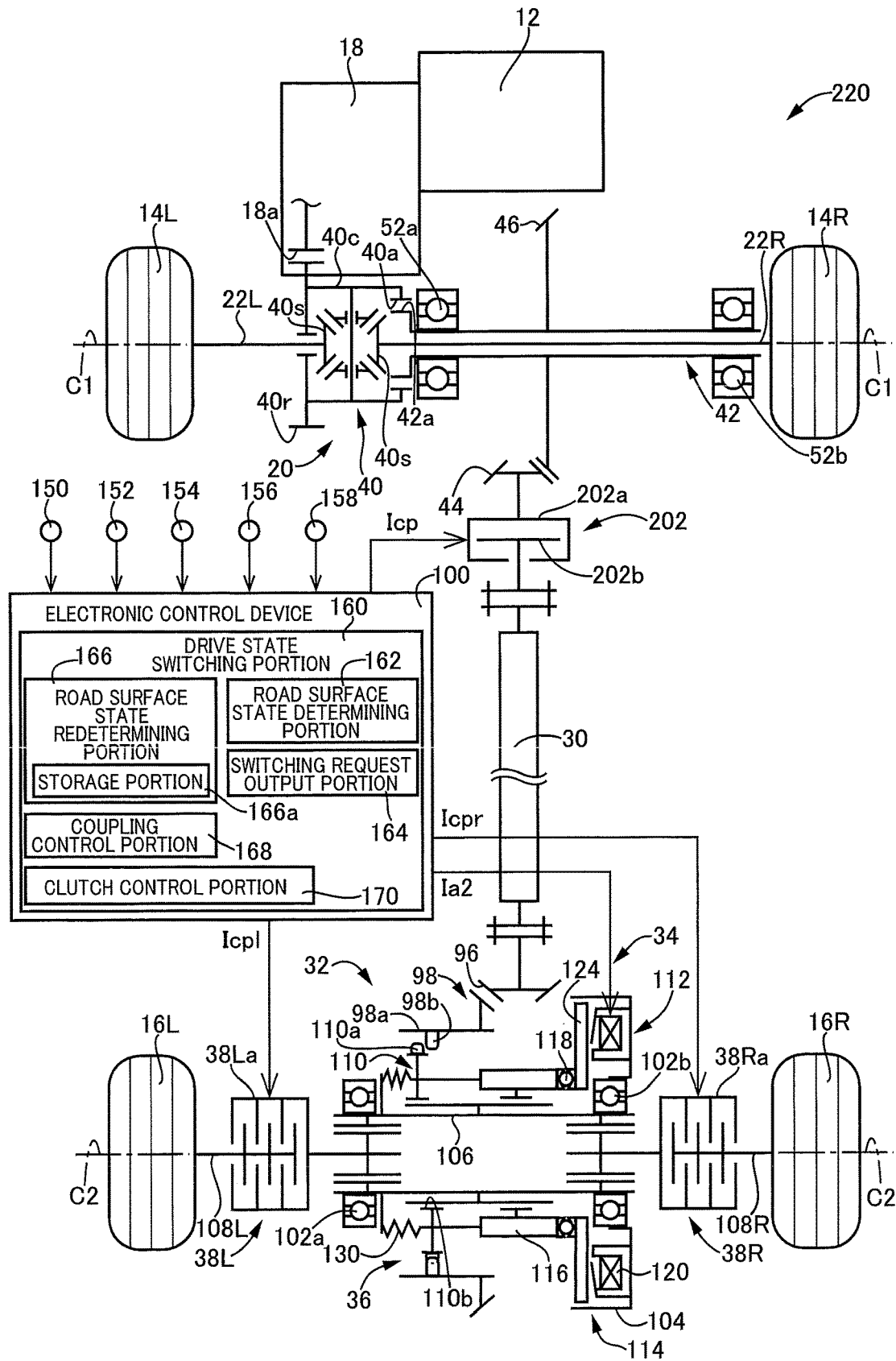
FIG. 10 is a diagram for explaining a control device of a four-wheel drive vehicle of still another example, i.e., a fifth example, of the present invention.

FIG. 10 is a diagram for explaining a four-wheel drive vehicle 220 according to another example of the present invention. As compared to the four-wheel drive vehicle 10 of the first example, the four-wheel drive vehicle 220 of this example is substantially the same as the four-wheel drive vehicle 10 of the first example except that the first dog clutch 26, i.e., the first connecting/disconnecting device 24, is removed to couple the input shaft 42 and the first ring gear 46 in a power transmittable manner, that the electronically controlled coupling 202 described above is disposed on a power transmission path between the driven pinion 44 and the propeller shaft 30, and that the functions of the coupling control portion 168 and the clutch control portion 170 included in the electronic control device 100 are partially changed. In the four-wheel drive vehicle 220, when the electronic control device 100 determines that the 2WD switching request is made, for example, the electronically controlled coupling 202 and the second dog clutch 36 are each brought into the released state to form the two-wheel drive state. In the four-wheel drive vehicle 220, when the electronic control device 100 determines that the 4WD switching request is made, the electronically controlled coupling 202 and the second dog clutch 36 are each brought into the engaged state and the left control coupling 38L and the right control coupling 38R are each brought into the engaged state to form the four-wheel drive state.

When the road surface state redetermining portion 166 redetermines that the running road surface is the high µ road, the clutch control portion 170 controls the second clutch drive current Ia2 (A) supplied to the second electromagnetic coil 120 of the second electromagnetic actuator 114 so that the second dog clutch 36 is switched from the engaged state to the released state.

When the road surface state redetermining portion 166 redetermines that the running road surface is the high µ road, the coupling control portion 168 stops the supply of the coupling drive current Icp to the electromagnetic coil of the electronically controlled coupling 202, i.e., cuts off the energization to the electronically controlled coupling 202, so as to release the electronically controlled coupling 202.

According to the above-described four-wheel drive vehicle 220, in the case of switching the drive state from the four-wheel drive state to the two-wheel drive state, the left control coupling 38L and the right control coupling 38R are temporarily released to redetermine whether the running road surface is the low µ road or the high µ road before releasing the second dog clutch 36 and the electronically controlled coupling 202, and when it is redetermined that the running road surface is the low µ road, switching from the four-wheel drive state to the two-wheel drive state is prohibited. Therefore, in the four-wheel drive vehicle 220, the same effects as the four-wheel drive vehicle 10 of the first example can be obtained. Specifically, in the four-wheel drive vehicle 220, inappropriate release of the second dog clutch 36 is suitably prevented when the running road surface is actually the low µ road.

Sixth Example

Figure 11:
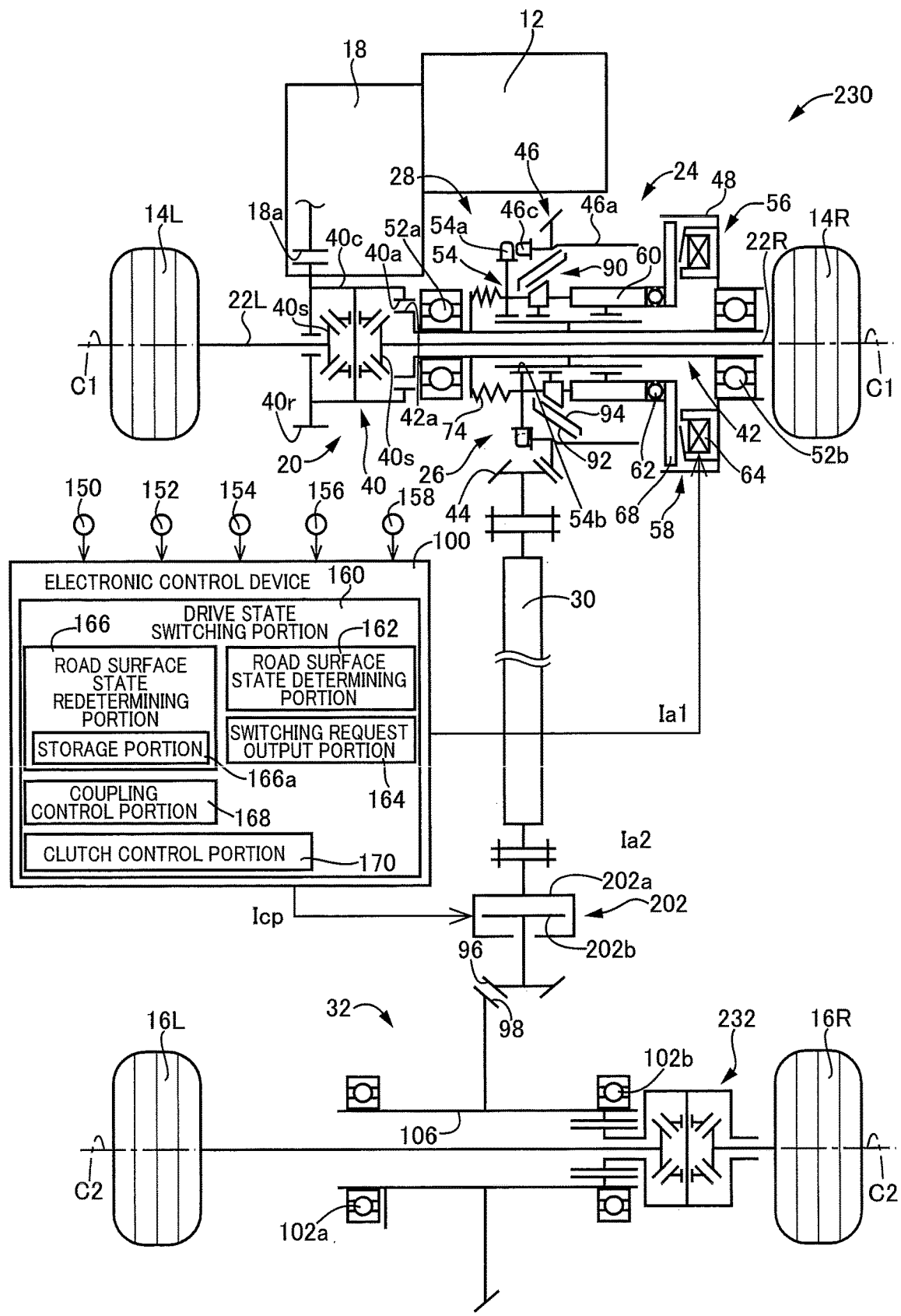
FIG. 11 is a diagram for explaining a control device of a four-wheel drive vehicle of still another example, i.e., a sixth example, of the present invention.

FIG. 11 is a diagram for explaining a four-wheel drive vehicle 230 according to another example of the present invention. As compared to the four-wheel drive vehicle 10 of the first example, the four-wheel drive vehicle 230 of this example is substantially the same as the four-wheel drive vehicle 10 of the first example except that the second dog clutch 36, i.e., the second connecting/disconnecting device 34, is removed to couple the center axle 106 and the second ring gear 98 in a power transmittable manner, that the left control coupling 38L and the right control coupling 38R are removed, that a differential device 232 is disposed on the power transmission path between the center axle 106 and the rear wheels 16L, 16R, that the electronically controlled coupling 202 described above is disposed on the power transmission path between the propeller shaft 30 and the drive pinion 96, and that the functions of the coupling control portion 168 and the clutch control portion 170 included in the electronic control device 100 are partially changed. In the four-wheel drive vehicle 230, when the electronic control device 100 determines that the 2WD switching request is made, for example, the first dog clutch 26 and the electronically controlled coupling 202 are each brought into the released state to form the two-wheel drive state. In the four-wheel drive vehicle 230, when the electronic control device 100 determines that the 4WD switching request is made, the first dog clutch 26 and the electronically controlled coupling 202 are each brought into the engaged state to form the four-wheel drive state.

When the switching request output portion 164 outputs the 2WD switching request and the storage portion 166a stores each of the slip ratio Sp and the yaw rate deviation ΔRyawp, the coupling control portion 168 stops the supply of the coupling drive current Icp supplied to the electromagnetic coil of the electronically controlled coupling 202, i.e., cuts off the energization to the electronically controlled coupling 202, so as to temporarily release the electronically controlled coupling 202 to bring the drive state into the two-wheel drive state in which the drive power from the engine 12 is distributed only to the front wheels 14L, 14R.

When the road surface state redetermining portion 166 redetermines that the running road surface is the low µ road, the coupling control portion 168 supplies the coupling drive current Icp to the electromagnetic coil of the electronically controlled coupling 202 so as to engage the electronically controlled coupling 202 to bring the drive state into the four-wheel drive state.

When the road surface state redetermining portion 166 redetermines that the running road surface is the high μ road, the clutch control portion 170 controls the first clutch drive current Ia1 (A) supplied to the first electromagnetic coil 64 of the first electromagnetic actuator 58 so that the first dog clutch 26 is switched from the engaged state to the released state.

When the road surface state redetermining portion 166 redetermines that the running road surface is the high μ road, the coupling control portion 168 stops the supply of the coupling drive current Icp to the electromagnetic coil of the electronically controlled coupling 202, i.e., cuts off the energization to the electronically controlled coupling 202, so as to release the electronically controlled coupling 202.

According to the above-described four-wheel drive vehicle 230, in the case of switching the drive state from the four-wheel drive state to the two-wheel drive state, the electronically controlled coupling 202 is temporarily released to redetermine whether the running road surface is the low μ road or the high μ road before releasing the first dog clutch 26, and when it is redetermined that the running road surface is the low μ road, switching from the four-wheel drive state to the two-wheel drive state is prohibited. Therefore, in the four-wheel drive vehicle 230, the same effects as the four-wheel drive vehicle 10 of the first example can be obtained. Specifically, in the four-wheel drive vehicle 230, inappropriate release of the first dog clutch 26 is suitably prevented when the running road surface is actually the low μ road.

Seventh Example

Figure 12:
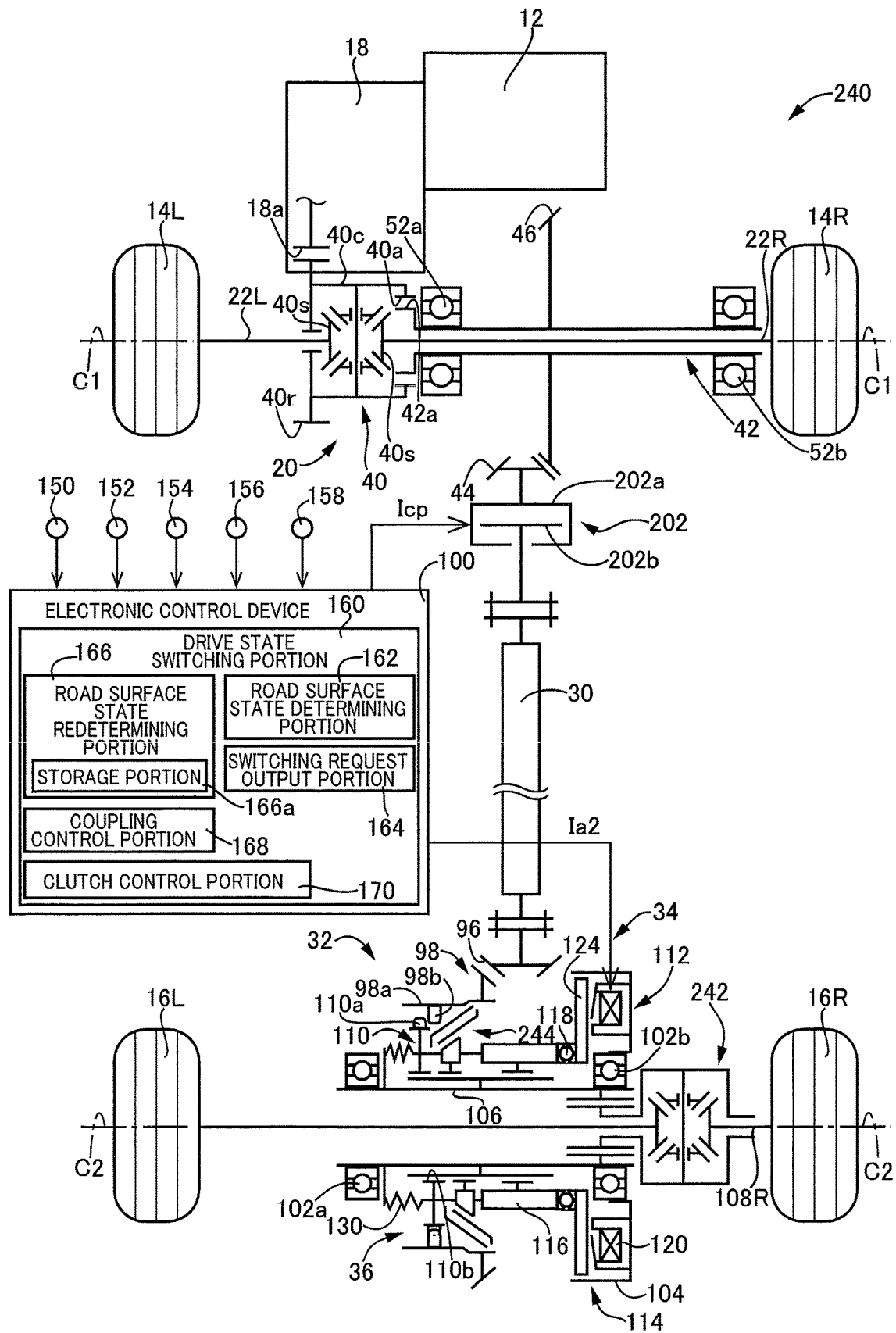
FIG. 12 is a diagram for explaining a control device of a four-wheel drive vehicle of still another example, i.e., a seventh example, of the present invention.

FIG. 12 is a diagram for explaining a four-wheel drive vehicle 240 according to another example of the present invention. As compared to the four-wheel drive vehicle 10 of the first example, the four-wheel drive vehicle 240 of this example is substantially the same as the four-wheel drive vehicle 10 of the first example except that the first dog clutch 26, i.e., the first connecting/disconnecting device 24, is removed to couple the input shaft 42 and the first ring gear 46 in a power transmittable manner, that the left control coupling 38L and the right control coupling 38R are removed, that a differential device 242 is disposed on the power transmission path between the center axle 106 and the rear wheels 16L, 16R, that the electronically controlled coupling 202 described above is disposed on the power transmission path between the driven pinion 44 and the propeller shaft 30, that the second connecting/disconnecting device 34 is provided with a synchronizing device 244 synchronizing rotation speed of the second ring gear 98 and rotation speed of the center axle 106 when the second dog clutch 36 is switched from the released state to the engaged state, and that the functions of the coupling control portion 168 and the clutch control portion 170 included in the electronic control device 100 are partially changed. In the four-wheel drive vehicle 240, when the electronic control device 100 determines that the 2WD switching request is made, for example, the second dog clutch 36 and the electronically controlled coupling 202 are each brought into the released state to form the two-wheel drive state. In the four-wheel drive vehicle 240, when the electronic control device 100 determines that the 4WD switching request is made, the second dog clutch 36 and the electronically controlled coupling 202 are each brought into the engaged state to form the four-wheel drive state.

When the switching request output portion 164 outputs the 2WD switching request and the storage portion 166a stores each of the slip ratio Sp and the yaw rate deviation ΔRyawp, the coupling control portion 168 stops the supply of the coupling drive current Icp supplied to the electromagnetic coil of the electronically controlled coupling 202, i.e., cuts off the energization to the electronically controlled coupling 202, so as to temporarily release the electronically controlled coupling 202 to bring the drive state into the two-wheel drive state in which the drive power from the engine 12 is distributed only to the front wheels 14L, 14R.

When the road surface state redetermining portion 166 redetermines that the running road surface is the low μ road, the coupling control portion 168 supplies the coupling drive current Icp to the electromagnetic coil of the electronically controlled coupling 202 so as to engage the electronically controlled coupling 202 to bring the drive state into the four-wheel drive state.

When the road surface state redetermining portion 166 redetermines that the running road surface is the high μ road, the clutch control portion 170 controls the second clutch drive current Ia2 (A) supplied to the second electromagnetic coil 120 of the second electromagnetic actuator 114 so that the second dog clutch 36 is switched from the engaged state to the released state.

When the road surface state redetermining portion 166 redetermines that the running road surface is the high μ road, the coupling control portion 168 stops the supply of the coupling drive current Icp to the electromagnetic coil of the electronically controlled coupling 202, i.e., cuts off the energization to the electronically controlled coupling 202, so as to release the electronically controlled coupling 202.

According to the above-described four-wheel drive vehicle 240, in the case of switching the drive state from the four-wheel drive state to the two-wheel drive state, the electronically controlled coupling 202 is temporarily released to redetermine whether the running road surface is the low μ road or the high μ road before releasing the second dog clutch 36, and when it is redetermined that the running road surface is the low μ road, switching from the four-wheel drive state to the two-wheel drive state is prohibited. Therefore, in the four-wheel drive vehicle 240, the same effects as the four-wheel drive vehicle 10 of the first example can be obtained. Specifically, in the four-wheel drive vehicle 240, inappropriate release of the second dog clutch 36 is suitably prevented when the running road surface is actually the low μ road.

Although the examples of the present invention have been described in detail with reference to the drawings, the present invention is also applicable in other forms.

In the four-wheel drive vehicle 10 of the first example described above, the first dog clutch 26 and the second dog clutch 36 are both disposed; however, for example, only one of the first dog clutch 26 and the second dog clutch 36 may be disposed. Although the four-wheel drive vehicle 10 of the first example described above is an FF-based (front-engine/front-drive-based) four-wheel drive vehicle, the vehicle 10 may be an FR (front-engine rear-wheel drive) type four-wheel drive vehicle, for example.

In the four-wheel drive vehicle 200 of the third example described above, the electronically controlled coupling 202 is disposed on the power transmission path between the drive pinion 96 and the propeller shaft 30; however, an electronically controlled coupling having the same structure as the electronically controlled coupling 202 may further be disposed on the power transmission path between the driven pinion 44 and the propeller shaft 30.

The four-wheel drive vehicle 200 of the third example described above includes the differential device 204; however, for example, the differential device 204 may be removed to dispose a left control coupling on the power transmission path between the center axle 106 and the rear wheel 16L and to dispose a right control coupling on the power transmission path between the center axle 106 and the rear wheel 16R, and additionally, the electronically controlled coupling 202 may be removed to dispose an electronically controlled coupling having the same structure as the electronically controlled coupling 202 on the power transmission path between the driven pinion 44 and the propeller shaft 30.

The four-wheel drive vehicle 200 of the third example described above includes the first differential device 40; however, for example, the first differential device 40 may be removed to dispose a left control coupling on the power transmission path between the input shaft 42 and the front wheel 14L and to dispose a right control coupling on the power transmission path between the input shaft 42 and the front wheel 14R.

In the four-wheel drive vehicle 230 of the sixth example described above, the electronically controlled coupling 202 is disposed on the power transmission path between the drive pinion 96 and the propeller shaft 30; however, an electronically controlled coupling having the same structure as the electronically controlled coupling 202 may further be disposed on the power transmission path between the driven pinion 44 and the propeller shaft 30.

The four-wheel drive vehicle 230 of the sixth example described above includes the first differential device 40; however, for example, the first differential device 40 may be removed to dispose a left control coupling on the power transmission path between the input shaft 42 and the front wheel 14L and to dispose a right control coupling on the power transmission path between the input shaft 42 and the front wheel 14R.

The four-wheel drive vehicle 230 of the sixth example described above includes the differential device 232; however, for example, the differential device 232 may be removed to dispose a left control coupling on the power transmission path between the center axle 106 and the rear wheel 16L and to dispose a right control coupling on the power transmission path between the center axle 106 and the rear wheel 16R, and additionally, the electronically controlled coupling 202 disposed on the power transmission path between the drive pinion 96 and the propeller shaft 30 may be removed to dispose an electronically controlled coupling having the same structure as the electronically controlled coupling 202 on the power transmission path between the driven pinion 44 and the propeller shaft 30.

The four-wheel drive vehicle 230 of the sixth example described above includes the differential device 232; however, for example, the differential device 232 may be removed to dispose a left control coupling on the power transmission path between the center axle 106 and the rear wheel 16L and to dispose a right control coupling on the power transmission path between the center axle 106 and the rear wheel 16R, and additionally, the first differential device 40 and the electronically controlled coupling 202 may be removed to dispose a left control coupling on the power transmission path between the input shaft 42 and the front wheel 14L and to dispose a right control coupling on the power transmission path between the input shaft 42 and the front wheel 14R.

In the four-wheel drive vehicle 240 of the seventh example described above, the electronically controlled coupling 202 is disposed on the power transmission path between the driven pinion 44 and the propeller shaft 30; however, an electronically controlled coupling having the same structure as the electronically controlled coupling 202 may further be disposed on the power transmission path between the drive pinion 96 and the propeller shaft 30.

The four-wheel drive vehicle 240 of the seventh example described above includes the first differential device 40; however, for example, the first differential device 40 may be removed to dispose a left control coupling on the power transmission path between the input shaft 42 and the front wheel 14L and to dispose a right control coupling on the power transmission path between the input shaft 42 and the front wheel 14R, and additionally, the electronically controlled coupling 202 may be removed to dispose an electronically controlled coupling having the same structure as the electronically controlled coupling 202 on the power transmission path between the propeller shaft 30 and the drive pinion 96.

The four-wheel drive vehicle 240 of the seventh example described above includes the first differential device 40; however, for example, the first differential device 40 may be removed to dispose a left control coupling on the power transmission path between the input shaft 42 and the front wheel 14L and to dispose a right control coupling on the power transmission path between the input shaft 42 and the front wheel 14R, and additionally, the electronically controlled coupling 202 and the differential device 242 may be removed to dispose a left control coupling on the power transmission path between the center axle 106 and the rear wheel 16L and to dispose a right control coupling on the power transmission path between the center axle 106 and the rear wheel 16R.

According to the first example described above, the road surface redetermining portion 166 redetermines that the running road surface is the low μ road when at least one of the redetermining results each based on the slip ratio S and the yaw rate deviation ΔRyaw indicates that the running road surface is the low μ road. However, the road surface redetermining portion 166 may determine that the running road surface is the low IA road when both of the redetermining results indicate that the running road surface is the low μ road. Otherwise, the road surface redetermining portion 166 may redetermine based on only either of the slip ratio S or the yaw rate deviation ΔRyaw.

The above description is merely an embodiment and the present invention can be implemented in variously modified and improved forms based on the knowledge of those skilled in the art.

REFERENCE SIGNS LIST 10, 200, 210, 220, 230, 240: four-wheel drive vehicle
12: engine (drive power source)
14L, 14R: front wheel (main drive wheel)
16L, 16R: rear wheel (sub-drive wheel)
26: first dog clutch (dog clutch)
30: propeller shaft (power transmitting member)
36: second dog clutch (dog clutch)
38L: left control coupling (electronically controlled coupling)
38R: right control coupling (electronically controlled coupling)
42: input shaft (first input rotating member, input rotating member)

46: first ring gear (first output rotating member, output rotating member)
98: second ring gear (second input rotating member, input rotating member)
100: electronic control device (control device)
106: center axle (second output rotating member, output rotating member)
160: drive state switching portion
162: road surface state determining portion
164: switching request output portion
166: road surface state redetermining portion
168: coupling control portion
202: electronically controlled coupling
H: change amount
H1: predetermined change amount (determination value)
tc: predetermined time
S: slip ratio
Sa1: first threshold value
Sa2: second threshold value
ΔRyaw: yaw rate deviation when an electrically controlled coupling is temporarily released
ΔRyawp: yaw rate deviation before an electrically controlled coupling is temporarily released

What is claimed is:

1. A four-wheel drive vehicle comprising:
a dog clutch selectively disconnecting or connecting a power transmission path between an input rotating member to which a portion of a drive power from a drive power source toward main drive wheels is input and an output rotating member coupled to sub-drive wheels in a power transmittable manner;
an electronically controlled coupling disposed on a power transmission path between the drive power source and the sub-drive wheels and adjusting the drive power transmitted from the drive power source to the sub-drive wheels; and
a control device providing a switching control between a four-wheel drive state in which the dog clutch is brought into an engaged state while the electronically controlled coupling is brought into an engaged state and a two-wheel drive state in which the dog clutch is brought into a released state, the control device switching a drive state to the four-wheel drive state when the control device determines that a running road surface is a low friction road and switching the drive state to the two-wheel drive state when the control device determines that the running road surface is a high friction road, wherein
the control device is configured to determine whether a request to switch the drive state from the four-wheel drive state to the two-wheel drive state is made,
when the control device determines that the request to switch the drive state from the four-wheel drive state to the two-wheel drive state is made, the control device temporarily releases the electronically controlled coupling to redetermine whether the running road surface is the low friction road or the high friction road before releasing the dog clutch, the control device prohibiting switching from the four-wheel drive state to the two-wheel drive state when it is redetermined that the running road surface is the low friction road.

2. The four-wheel drive vehicle according to claim 1, wherein
the dog clutch includes
a first dog clutch selectively disconnecting or connecting a power transmission path between a first input rotating member to which a portion of the drive power from the drive power source toward the main drive wheels is input and a first output rotating member coupled via a power transmitting member to the sub-drive wheels and
a second dog clutch selectively disconnecting or connecting a power transmission path between a second input rotating member coupled to the power transmitting member and a second output rotating member coupled to the sub-drive wheels, wherein
the electronically controlled coupling is disposed on a power transmission path between the first output rotating member and the sub-drive wheels, and wherein
the control device provides the switching control between a four-wheel drive state in which the first dog clutch and the second dog clutch are each brought into the engaged state while the electronically controlled coupling is brought into the engaged state and a two-wheel drive state in which the first dog clutch and the second dog clutch are each brought into the released state.

3. The four-wheel drive vehicle according to claim 1, wherein
the control device redetermines that the running road surface is the low friction road when a slip ratio of at least one of the main drive wheels and the sub-drive wheels exceeds a first threshold value set in advance or when the slip ratio exceeds a second threshold value set smaller than the first threshold value and the slip ratio exceeds the second threshold value for a time longer than a predetermined time set in advance.

4. The four-wheel drive vehicle according to claim 3, wherein
the first threshold value is determined based on the slip ratio before the electronically controlled coupling is temporarily released.

5. The four-wheel drive vehicle according to claim 1, wherein
the control device redetermines that the running road surface is the low friction road when a change amount exceeds a predetermined determination value set in advance between a yaw rate deviation before temporarily releasing the electronically controlled coupling and a yaw rate deviation when the electronically controlled coupling is temporarily released.

6. The four-wheel drive vehicle according to claim 1, wherein
the electronically controlled coupling is a pair of control couplings respectively coupled to the left and right sub-drive wheels.

7. The four-wheel drive vehicle according to claim 1, wherein the main drive wheels are front wheels, and wherein the sub-drive wheels are rear wheels.

* * * * *